United States Patent
Sugimoto et al.

(10) Patent No.: US 7,489,685 B2
(45) Date of Patent: Feb. 10, 2009

(54) DIGITAL BROADCAST RECEIVING APPARATUS

(75) Inventors: Keishi Sugimoto, Aichi (JP); Naoe Kato, Aichi (JP)

(73) Assignee: Panasonic Corporation, Osaka (JP)

( * ) Notice: Subject to any disclaimer, the term of this patent is extended or adjusted under 35 U.S.C. 154(b) by 1587 days.

(21) Appl. No.: 09/781,239

(22) Filed: Feb. 13, 2001

(65) Prior Publication Data

US 2001/0015986 A1    Aug. 23, 2001

(30) Foreign Application Priority Data

Feb. 21, 2000    (JP)    ............ P2000-042531

(51) Int. Cl.
H04L 12/28    (2006.01)

(52) U.S. Cl. ................ 370/391; 370/400
(58) Field of Classification Search .......... 370/389, 370/477, 537

See application file for complete search history.

(56) References Cited

U.S. PATENT DOCUMENTS

| | | | | |
|---|---|---|---|---|
| 5,691,986 | A * | 11/1997 | Pearlstein | 370/477 |
| 5,835,493 | A * | 11/1998 | Magee et al. | 370/395.62 |
| 6,002,687 | A * | 12/1999 | Magee et al. | 370/394 |
| 6,172,988 | B1 * | 1/2001 | Tiernan et al. | 370/473 |
| 6,219,358 | B1 * | 4/2001 | Pinder et al. | 370/537 |
| 6,219,538 | B1 * | 4/2001 | Kaminsky et al. | 455/410 |
| 6,292,724 | B1 | 9/2001 | Apsell et al. | |
| 6,343,379 | B1 * | 1/2002 | Ozawa et al. | 725/63 |
| 6,351,474 | B1 * | 2/2002 | Robinett et al. | 370/486 |
| 6,353,613 | B1 * | 3/2002 | Kubota et al. | 370/389 |
| 6,590,902 | B1 * | 7/2003 | Suzuki et al. | 370/465 |
| 6,678,332 | B1 * | 1/2004 | Gardere et al. | 375/240.26 |
| 6,788,710 | B1 * | 9/2004 | Knutson et al. | 370/535 |
| 6,826,183 | B1 * | 11/2004 | Itoi | 370/392 |
| 6,944,186 | B2 * | 9/2005 | Zaun et al. | 370/487 |
| 6,968,494 | B2 * | 11/2005 | Zhang | 714/790 |
| 6,988,238 | B1 * | 1/2006 | Kovacevic et al. | 714/799 |

(Continued)

FOREIGN PATENT DOCUMENTS

EP    0 915 617 A2    5/1999

(Continued)

OTHER PUBLICATIONS

O. W. Bungum, "Transmultiplexing, Transcontrol and Trans-scrambling of MPEG-2/DVB Signal", International Broadcasting Convention, Sep. 12-16 1996, p. 288-293.

Primary Examiner—Edan Orgad
Assistant Examiner—Jung Park
(74) Attorney, Agent, or Firm—McDermott Will & Emery LLP

(57) ABSTRACT

Based on PIDs registered in a necessary-PID table, a second TS-packet extracting section extracts necessary packets from a second TS. Based on packets registered in the table, a detecting section detects unnecessary-packet areas in a first TS. A TS-packet overwriting section overwrites the extracted necessary packets to unnecessary-packet areas in the first TS, performs multiplexing thereof, and thereby generates a CTS, which is common to the TSs. Thereby, while a broadcast program in the first TS is viewed, image-recording of a broadcast program in the second TS can be performed. Since the configuration can be made using a separating section, a decoder, a digital interface, and the like for handling single-system TSs, reduction in the cost and size can be implemented.

14 Claims, 28 Drawing Sheets

U.S. PATENT DOCUMENTS 7,113,546 B1 * 9/2006 Kovacevic et al. ..... 375/240.26
2002/0120465 A1 8/2002 Mori et al.

FOREIGN PATENT DOCUMENTS

| EP | 0 917 355 A1 | 5/1999 |
| EP | 1 244 045 A1 | 9/2002 |
| JP | 11-122556 | 4/1999 |
| WO | WO 98/16067 A | 4/1998 |
| WO | WO 99/37048 A | 7/1999 |

* cited by examiner

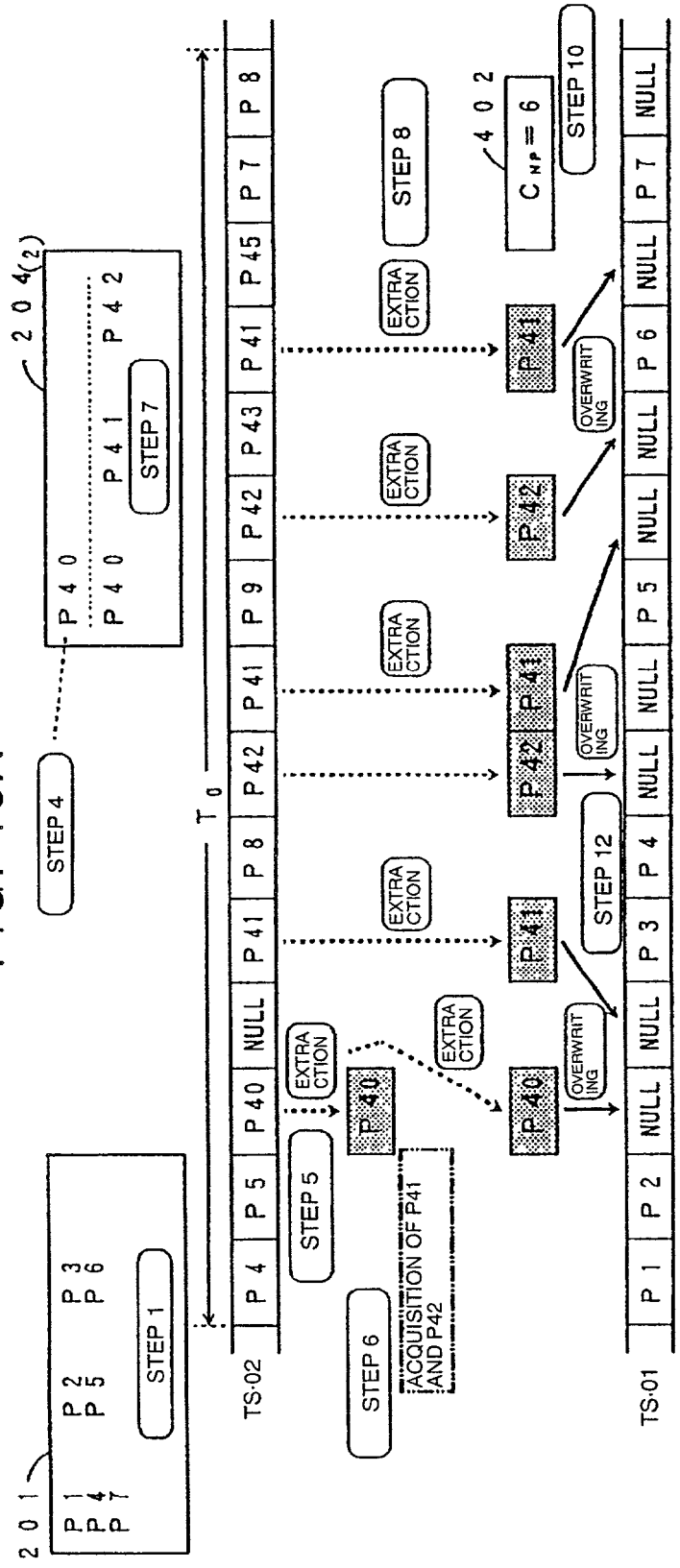
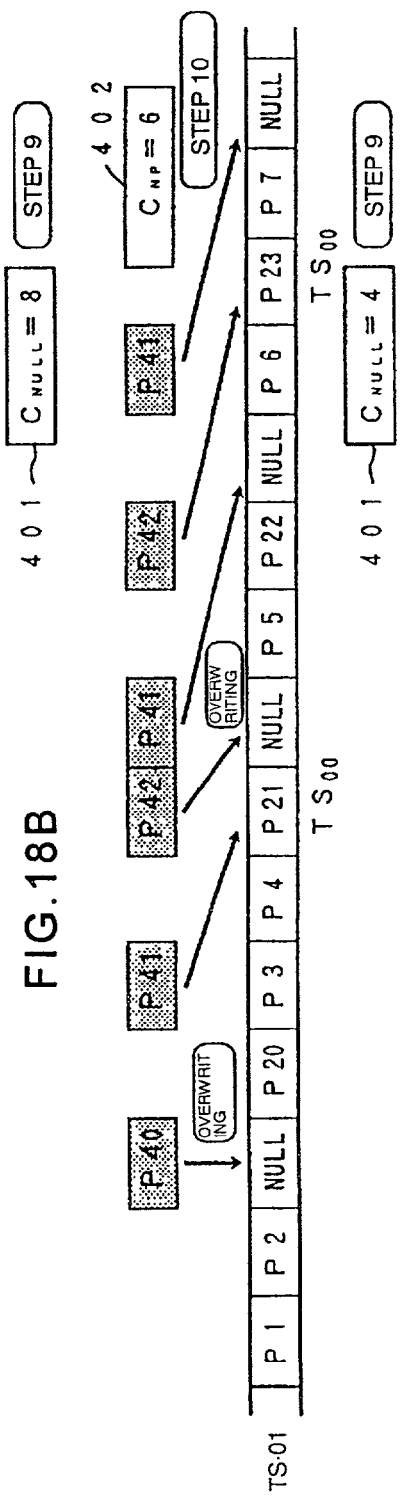
FIG. 18A
FIG. 18B

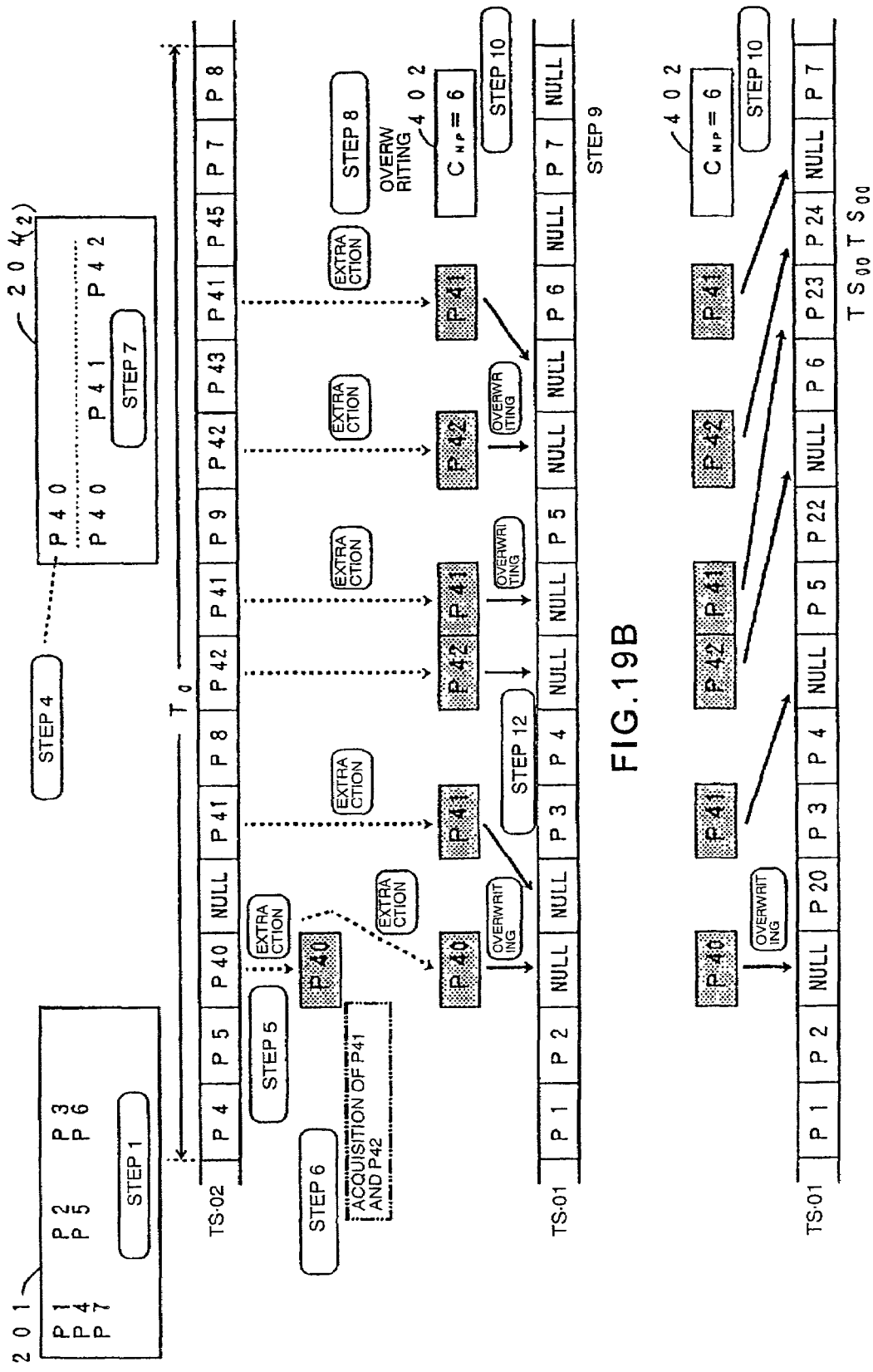

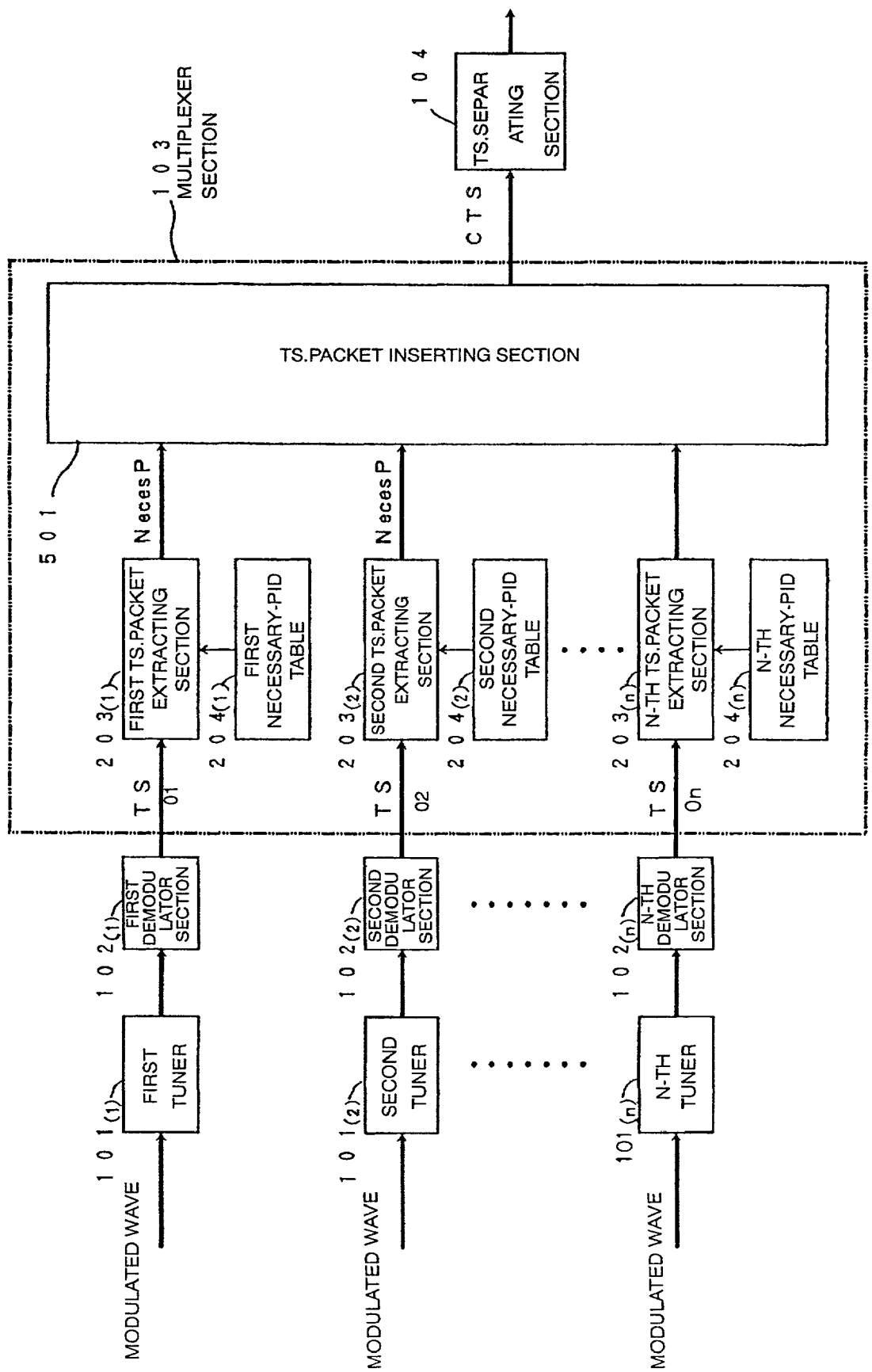

FIG. 22
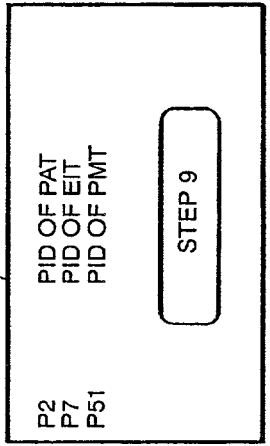
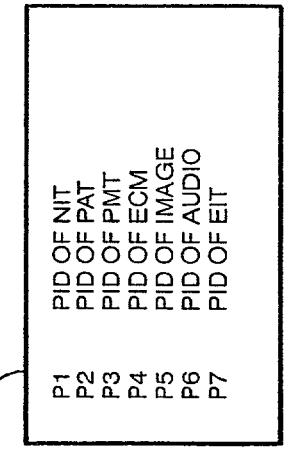

FIG. 23
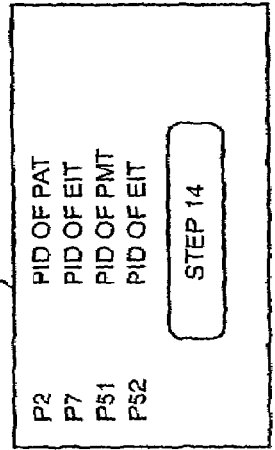
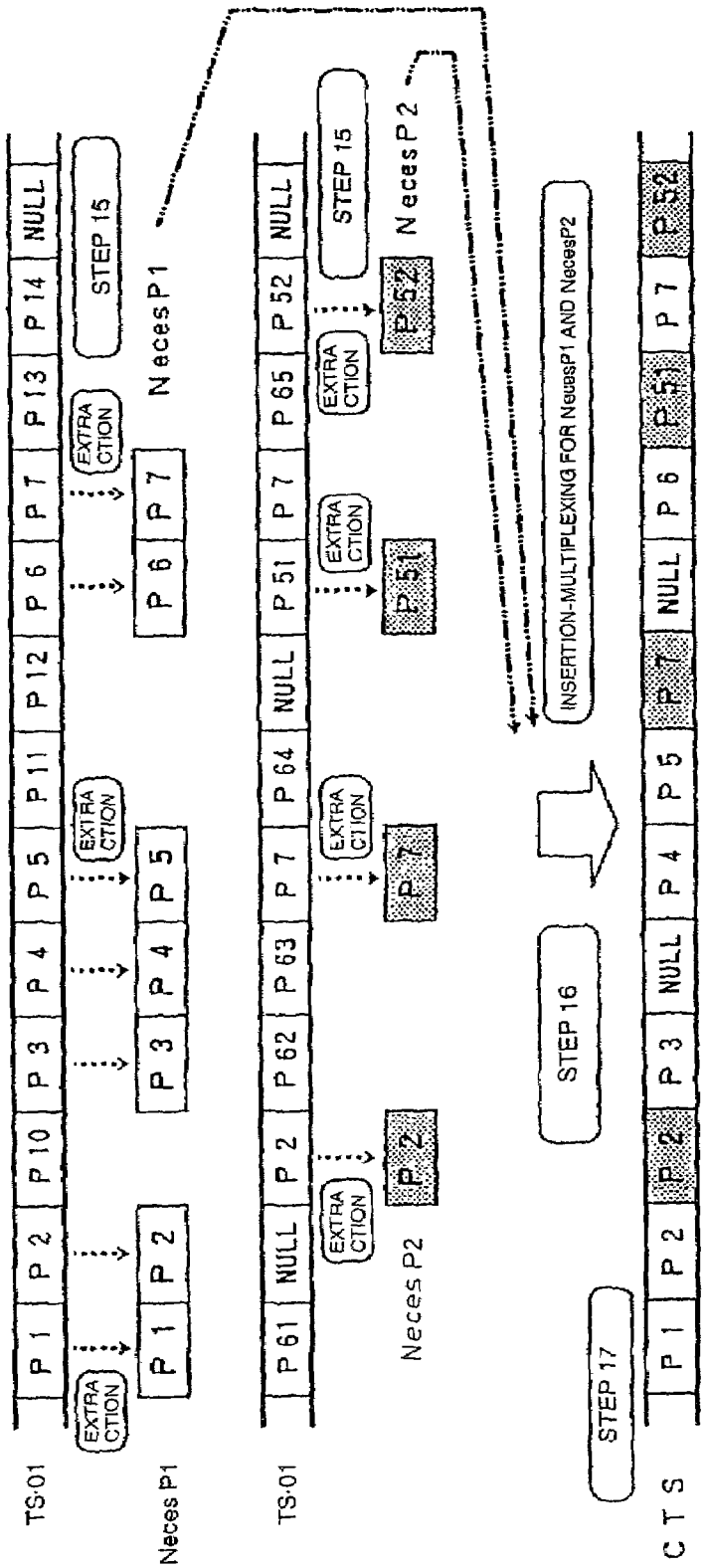
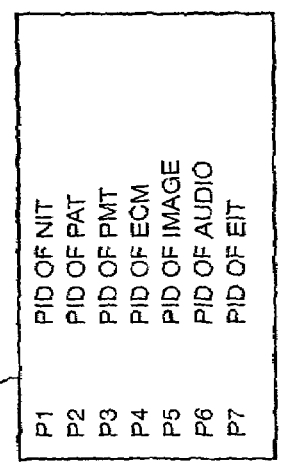

DIGITAL BROADCAST RECEIVING APPARATUS

BACKGROUND OF THE INVENTION

1. Field of the Invention

The present invention relates to a digital broadcast receiving apparatus for receiving digital broadcasts. In digital broadcast services, various broadcast programs (contents), such as image broadcast programs, image broadcast program service information, data broadcast programs, downloadable data, and music broadcast programs, are individually digitized, multiplexed, and thereby broadcasted. Types of digital broadcasts to be handled by the present invention include CS digital broadcasts, BS digital broadcasts, ground-wave digital broadcasts, and CATV digital broadcasts.

2. Description of the Related Art

In digital broadcast services, plural broadcast programs are multiplexed and broadcasted in one channel. Plural channels are used in the services.

Transmitted modulated waves are received by tuners; demodulation and error correction thereof are performed in demodulator sections to generate transport streams (each of which will be referred to as a "TS", hereinbelow); and a TS-separating section retrieves streams each consisting of TS packets (each of which may simply be referred to as a "packet", hereinbelow). For example, an acquired image stream is converted by an image decoder into image information, and an image is displayed on the screen of a monitor. An acquired audio stream is converted by an audio decoder into an audio signal stream, and the signal steam is output from a speaker as audio. Acquired transport information is transferred to a digital recording device via a digital interface and is recorded therein.

With a digital broadcast receiving apparatus capable of processing only TSs of a single system, there occur cases where a plurality of contents cannot be simultaneously obtained.

For example, when a TS including a viewing-desired broadcast program and a TS including an image-recording-desired broadcast program exist on different transmission lines, screen-viewing and image-recording cannot be simultaneously performed.

In addition, as in the case of CS digital broadcasting, in the case where a broadcast-program layout information (service information (SI)) for making a broadcast program table can be transmitted only from a designated TS, when a viewing broadcast program is included in a TS differing from that including the SI, the broadcast program table cannot be displayed during screen-viewing.

Also, in the case where downloadable data can be transmitted only from a specific TS, when a viewing broadcast program is included in a TS that is different from that including the downloaded program, a new program cannot be downloaded during screen-viewing.

Similarly, in the case where a TS including a broadcast program desired to view is different from a TS including a data broadcast such as an EMD (electronic music delivery), the data broadcast cannot be received during screen-viewing.

A plurality of TSs can selectively be received if the receiver is configured such that a plurality of tuners and a plurality of demodulator sections are provided, and the plurality of demodulator sections is connected to and/or disconnected from a single TS-separating section. However, as long as the single TS-separating section is provided, no change is made in that processing can be performed only in units of one TS.

If the receiver is configured such that either the TS-separating sections are provided corresponding in number to TSs desired to process, arbitrary contents included in a plurality of different TSs are combined so as to be obtained at the same time. In this case, however, the cost would be significantly increased, and the size of the receiver would be anyway increased.

As a technique that allows plural TSs to be processed, and in addition, that allows arbitrary contents to be extracted from arbitrary TSs, a digital broadcast receiving apparatus is disclosed in Japanese Unexamined Patent Application Publication No. 11-122556 (or, 1999-122556).

The digital broadcast receiving apparatus disclosed in the above-referenced publication comprises plural tuners, plural demodulator sections individually connected to tuners, and a multiplexer section provided between the plural demodulator sections and a TS-separating section.

The multiplexer section performs time-division multiplexing of TSs of plural systems in units of a packet to thereby generate a new TS. It is characterized in that the time-division multiplexing is performed at a frequency higher than the sum of transmission bit rates in plural-system broadcast methods. The multiplexing is performed in this manner in order to multiplex the plural TSs as in the state of including all packets, each of which is included in the individual TS.

However, the digital broadcast receiving apparatus disclosed in Japanese Unexamined Patent Application Publication No. 11-122556 (or, 1999-122556) arises the following problems.

In order to perform the time-division multiplexing at a frequency higher than the sum of transmission bit rates of individual broadcast signals, a high-performance oscillator for generating such a high frequency is required. Even with such an oscillator, time-division multiplexing at a frequency higher than that generated by the oscillator cannot be performed. Therefore, an expensive oscillator must be used.

In addition, in the case where the bit rate of the single new TS generated by the multiplexing is higher than a predetermined value, it is difficult for such a rear-stage TS-separating section to process TSs. Therefore, when plural TSs are multiplexed in the above condition, there can occur a case where intended packets cannot be separated.

Moreover, when the same PID (packet identifier) is used for individual broadcast signal, since the same PIDs are mixed in one TS, decoding cannot be performed.

As shown as examples in the above-referenced patent application publication, when broadcast-method identifiers are allocated to all the packets, the receiver may not be able to provide the intended functions. To enable the functions, a separate TS-separating section capable of processing TSs including the broadcast-method identifiers. However, it would significantly increase the cost.

SUMMARY OF THE INVENTION

Accordingly, in order to enable various types of broadcast services, a primary object of the present invention is to solve the problems that can occur in the case where time-division multiplexing is performed for plural TSs at a frequency higher than the sum of transmission bit rates to thereby generate single-system TSs.

Particularly, the object is to reduce a necessary frequency of a frequency-generating means, which is required for a multiplex means, to thereby implement the cost to be reduced.

Another object of the present invention is to allow plural packets in different TSs to be identified from each other to obtain a desired one of the packets even in the case where the packets to be multiplexed have the same PID.

Other objects and advantages of the invention will become apparent from the description given below in detail.

In order to achieve the aforementioned objects, a digital broadcast receiving apparatus of the present invention is configured as summarized below. Persistently, a primary concept of the present invention involves identifiers used for specifying packets that are included in a TS and that are required by a user.

In this Specification, each of the packets required by the user is defined as a "necessary packet". Also, in this Specification, the identifier used to specify the necessary packet is defined as "necessary packet identifier" and is referred to as a "PID". Necessary packets included in a TS are grasped according to necessary PIDs corresponding thereto.

In addition, similar necessary packets included in a different TS are grasped according to necessary PIDs corresponding thereto. The number of TSs to be handled is not restricted to two, but it may be three or larger.

Although the number of TSs to be multiplexed is two or larger, depending on cases, the plurality of TSs are represented by a first TS and a second TS for easy understanding.

Categories of necessary packets in the plurality of TSs may either be different from each other or be the same in part or in entirety. The categories of necessary packets include viewing-desired broadcast program data, broadcast-program-table related data, downloadable data, image-recording-desired broadcast program data, and data-broadcast program data.

Necessary packets in plural TSs are multiplexed through, for example, overwriting or insertion to thereby generate a single new common TS. In this Specification, the single new common TS is defined as a "custom transport stream" and is referred to as a "CTS".

In a CTS thus newly generated, plural necessary packets are included in plural TSs originally different from each other in a merged state. Therefore, the digital-broadcast reception mode can be significantly enriched in variety.

Thereby, regardless of which TS includes an image-and/or-audio involving broadcast program, a broadcast program table, downloadable data, and information of a data broadcast such as an electronic music delivery, screen-viewing, broadcast-program-table display, downloading, data-broadcast reception, multiscreen display, and the like can be arbitrarily combined and displayed at the same time.

For example, digital-broadcast reception rich in variety can be implemented such that while a broadcast program is viewed, a broadcast program table included in the second TS, which is different from the first TS including the aforementioned broadcast program, is displayed; while a broadcast program included in the first TS is viewed, a broadcast program included in the second TS is image-recorded; while a broadcast program included in the first TS is viewed, either data such as a program included in the second TS is downloaded, or a data broadcast program is received; while a broadcast program included in the first TS is image-recorded, either a program or the like included in the second TS is downloaded, or a data broadcast program included in the second TS is received; and while a data broadcast program included in the first TS is received, data such as a program included in the second TS is downloaded.

To achieve the above, it is sufficient to separate necessary packets from a common CTS including plural necessary packets in a merged state in plural TSs originally different from each other.

Therefore, use of a single common TS-separating section is sufficient even for the plural TSs. This allows the configuration to be built with various rear-stage members, such as a decoder and a digital interface, for handling single-system TSs. Thereby, reduction in the cost and size can be implemented.

Characteristics of the present invention are not restricted to those described above. Suppose it is a precondition that all packets in each of the plural TSs are multiplexed.

In this case, in order to generate single-system TSs, time-division multiplexing must be performed at frequency higher than the sum of transmission bit rates of the individual TSs. This requires a high-frequency generating means.

According to the present invention, not all packets included in the TSs are multiplexed. In the invention, the packets are grasped according to their PIDs, and multiplexing is executed for extracted necessary packets. In this case, such a high-frequency generating means is not required; therefore, the cost can be reduced. In addition, the invention is advantageous in that TSs having high bit rates can be processed.

In addition, when packets to be multiplexed through the overwriting or the insertion have identical PIDs, the PIDs are rewritten and converted to different PIDs. Thereby, the plural packets originally belonged to the different TSs can still be identifiable from one another in the common CTS, allowing individual PIDs of all the PIDs to be determined to be unique. Therefore, desired packets can be acquired securely and accurately.

Hereinbelow, the present invention will be summarized in more detail.

A first problem-solving means is configured to multiplex packets corresponding to necessary PIDs in a first TS with packets corresponding to necessary PIDs in a second TS.

According to the above problem-solving means, a common CTS is generated in a condition that plural TSs originally different from each other are merged together.

Therefore, a TS-separating means and various rear-stage members, such as a decoder and an interface, can be structured to be simple for processing single-system TSs.

In addition, the problem-solving means avoids the necessity of such a high-frequency generating means as used in the case where the time-division multiplexing is performed at a frequency higher than the sum of transmission bit rates of individual TSs.

Also, since TSs having higher bit rates can be handled, the cost and size can be reduced overall.

A second problem-solving means is configured such that overwriting of packets corresponding to necessary PIDs in a second TS is performed to unnecessary-packet areas corresponding to unnecessary PIDs in a first TS. In this case, the first TS is not divided in units of the packet, and is used as in the stream state; whereas the second TS is divided in the units of the packet.

Therefore, for the first TS, the unnecessary-packet areas are grasped as in the stream state according to the unnecessary PIDs; and from the second TS, the necessary packets are extracted in the units of the packet according to the necessary PIDs.

According to the overwriting of the necessary packets extracted from the second TS to the unnecessary-packet areas in the first TS, there is generated a common CTS including the plural necessary packets, which are originally included in the plural TSs that are different from each other, in the state where they are merged together.

According to the above-described problem-solving means, effects similar to the preceding case are provided. In addition, since the first TS need not be divided in the units of the packet, the CTS can be efficiently generated.

A third problem-solving means is configured such that packets corresponding to necessary PIDs in a first TS are extracted, packets corresponding to necessary PIDs in a second TS are extracted, and insertion is performed so that the packets extracted from the first TS and the packets extracted from the second TS are mutually inserted.

In this configuration, the necessary packets are divided in the units of the packet and extracted according to the necessary PIDs in either the first TS or the second TS. The necessary packets extracted from the two TSs are mutually inserted to thereby generate a common CTS.

According to the above-described problem-solving means, effects similar to the preceding case are provided. In addition, for the CTS to be generated, a relatively large number of necessary packets for composing it can be secured.

Specifically, in the second problem-solving means, since the necessary packets are overwritten in the state where the stream form of the first TS is maintained, the probability that the unnecessary packets originally included in the first TS remain is relatively high, and the number of the remaining necessary packets is therefore relatively large.

However, in the third problem-solving means in which the two TSs are divided in the units of the necessary packets, and the necessary packets are then extracted, a relatively large number of the necessary packets can be included in the CTS.

As a preferable mode, based on the first problem-solving means, a fourth problem-solving means is configured such that when packets to be multiplexed by either the overwriting or the insertion, the PIDs on at least one of the TS sides are rewritten to make the PIDs to be different from one another.

This includes the case where the necessary packets in the second TS are overwritten and the case where the necessary packets in the first TS are overwritten.

In addition, a case where the necessary packets in the two TSs may be included. This particular case will be described below. In any one of the cases, rewriting is performed so that post-overwriting PIDs are not duplicated with PIDs of the remaining PIDs or PIDs of the necessary packets.

According to this problem-solving means, even when original PIDs are identical, the packets of the plural TSs, which are to be multiplexed in the common CTS, are converted so as to have the relationship in which the PIDs are identifiable from one another.

Therefore, for all packets in the CTS, since the individual PIDs can be determined to be unique, desired packets can be acquired securely and accurately.

Based on the fourth problem-solving means, a fifth problem-solving means is configured such that PIDs of packets on the TS side adding packets through overwriting are rewritten.

According to this problem-solving means, although the stream form of the TS on the side where packets are added remains unchanged, packets on the adding side are already separated from the stream in the units of the packet. Therefore, the PIDs are rewritten even more efficiently.

As a preferable mode, based on the second problem-solving means, a sixth problem-solving means is configured such that, as the unnecessary-packet areas corresponding to the unnecessary PIDs, NULL-packet areas are given priority. This applies to the overwriting type as a packet-multiplexing mode.

This problem-solving means operates and provides effects as follows. Since contents (elements) of either identical types or different types that are included in different TSs are arbitrarily combined to thereby generate a common CTS, the contents randomly vary depending on the case, involving variations of unnecessary PIDs of packets included therein.

However, since NULL-packet areas are given priority as the unnecessary-packet areas on the side where packets are added through the overwriting, the overwriting thereof can be efficiently performed.

As a preferable mode, a seventh problem-solving means comprises an unnecessary-packet detecting means for detecting unnecessary-packet areas corresponding to unnecessary PIDs in a first TS that is input; a necessary-packet extracting means for extracting packets corresponding to necessary PIDs in a second TS; and a packet-overwriting means for overwriting packets extracted by the necessary-packet extracting means to the unnecessary-packet areas detected by the unnecessary-packet detecting means in the TS.

This is equivalent to the configuration of the second problem-solving means that would be described more specifically.

This problem-solving means operates and provides effects as follows. According to unnecessary PIDs corresponding to the first TS, the unnecessary-packet detecting means detects unnecessary-packet areas in the first TS.

According to necessary PIDs corresponding to the second TS, the necessary-packet extracting means divides necessary packets and extracts the necessary packets from the second TS. The packet-overwriting means overwrites the extracted necessary packets to the unnecessary-packet areas in the first TS.

According to the above operation, there is generated a common CTS including the plural necessary packets, which are originally included in the plural TSs that are different from each other, in the state where they are merged together.

According to this problem-solving means, a TS-separating means and various rear-stage members, such as a decoder and an interface, can be structured to be simple for processing single-system TSs. In addition, the problem-solving means avoids the necessity of such a high-frequency generating means as used in the case where the time-division multiplexing is performed at a frequency higher than the sum of transmission bit rates of individual TSs.

Also, since TSs having higher bit rates can be handled, the cost and size can be reduced overall. In addition, since the first TS need not be divided in units of the packet, and can be used as in the stream state, the CTS can be efficiently generated.

As a preferable mode, an eighth problem-solving means comprises a first necessary-packet extracting means for extracting packets corresponding to necessary PIDs in a first TS that is input; a second necessary-packet extracting means for extracting packets corresponding to necessary PIDs in a second TS that is input; and a packet-inserting means for performing insertion of packets on the two TS sides to be mutually inserted to thereby generate a new TS.

This is equivalent to the configuration of the third problem-solving means that would be described more specifically.

This problem-solving means operates and provides effects as follows. According to necessary PIDs corresponding to the first TS, the first necessary-packet extracting means divides necessary packets and extracts the necessary packets from the first TS.

According to necessary PIDs corresponding to the second TS, the second necessary-packet extracting means divides necessary packets and extracts the necessary packets from the second TS. The packet-inserting means performs insertion so that first extracted necessary packets and a second extracted necessary packets are mutually inserted (assembled).

According to the above operation, there is generated a common CTS including the plural necessary packets, which are originally included in the plural TSs that are different from each other, in the state where they are merged together.

According to this problem-solving means, a TS-separating means and various rear-stage members, such as a decoder and an interface, can be structured to be simple for processing single-system TSs.

In addition, the problem-solving means avoids the necessity of such a high-frequency generating means as used in the case where the time-division multiplexing is performed at a frequency higher than the sum of transmission bit rates of individual TSs.

Also, since TSs having higher bit rates can be handled, the cost and size can be reduced overall. In addition, since the two TSs are divided in the units of the necessary packets, and the necessary packets are then extracted, a relatively large number of the necessary packets can be included in the CTS.

As a preferable mode, based on the seventh means, a ninth problem-solving means comprises an identical-PID determining means for performing determination whether identical PIDs exist on the two TS sides of the packets that are to be multiplexed with each other through the overwriting; and a PID-converting means for performing rewriting of PIDs of packets on at least one of the two TS sides so that opponent-side PIDs are differentiated therefrom for packets that are determined by the identical-PID determining means to have identical PIDS.

This is equivalent to the configuration of the fourth problem-solving means that would be described more specifically.

As a preferable mode, a tenth problem-solving means comprises an identical-PID determining means for performing determination whether identical PIDs exist on the two TS sides of the packets that are to be multiplexed with each other through the insertion; and a PID-converting means for performing rewriting of PIDs of packets on at least one of the two TS sides so that opponent-side PIDs are differentiated therefrom for packets that are determined by the identical-PID determining means to have identical PIDs.

These problem-solving means operates and provides effects as follows. The identical-PID determining means performs determination whether identical PIDs exist on the two TS sides of the necessary packets that are to be multiplexed with each other.

If it finds identical PIDs, it feeds the determination result to the PID-converting means. According to the determination result, the PID-converting means performs rewriting of PIDs and adjust them so as to be different from one another for all the necessary packets.

Thereafter, either overwriting is executed as is done in the seventh problem-solving means, or insertion is executed as is done in the eighth problem-solving means to thereby generate a CTS.

As a result, for all packets to be multiplexed in the CTS, their individual PIDs can be determined to be unique. Therefore, desired packets can be acquired securely and accurately.

As a preferable mode, an eleventh problem-solving means comprises a first necessary-packet extracting means for extracting packets corresponding to necessary PIDs in a first TS that is input; a second necessary-packet extracting means for extracting packets corresponding to necessary PIDs in a second TS that is input; a PID-converting means for rewriting PIDs of all packets extracted on the two TS sides so as to be identical from one another; and a packet-inserting means for performing insertion of the PID-rewritten packets on the two TS sides to be mutually inserted to thereby generate a new TS.

This problem-solving means operates and provides effects as follows. The PID-converting means rewrites PIDs for all packets extracted from the two TSs. At this time, all the PIDs are rewritten to be different from one another.

As a result, for all packets to be multiplexed in the CTS, their individual PIDs can be determined to be unique. Therefore, desired packets can be acquired securely and accurately.

As a preferable mode, based on the eleventh problem-solving means, a twelfth problem-solving means is configured such that the PID-converting means memorizes a start PID number that is used for the subsequent multiplexing processing, and updates the start PID number every time the multiplexing processing is executed.

This problem-solving means provide the following effects. If the CTS includes duplicated PIDs for images, audio, and the like, the CTS cannot be played back normally. For example, block noise is generated on images, or abnormal sounds are generated in audio.

By changing PIDs every time a CTS is created to thereby making all PIDs in plural CTSs to be different from one another, such problems can be prevented.

In a thirteenth problem-solving means, the means for rewriting the PIDs is configured to convert the PIDs so as to be opened to a user. As a matter that is commonly applicable to all the problem-solving means that rewrite PIDs, user-data-using numbers defined by the MPEG-2 standards are preferably used for the PIDs that are to be rewritten. The numbers are not used by the system, but are opened to users. Thereby, problems that can occur in compatibility can be prevented.

As a preferable mode, based on the seventh problem-solving means, a fourteenth problem-solving means comprises a NULL-packet counting means for counting NULL packets coming from the overwritten-side TS; a packet counting means for counting post-extraction NULL packets on the TS side adding packets through overwriting; a comparing means for comparing a NULL-packet count value output by the NULL-packet counting means with a packet count value output by the packet counting means; and a NULL-packet-priority specifying means for specifying NULL-packet areas with priority as unnecessary-packet areas corresponding to the unnecessary PIDs when the former count value is equal to or greater than the latter count value.

This is equivalent to the configuration of the problem-solving means 6 that would be described more specifically.

This problem-solving means operates and provides effects as follows. The NULL-packet counting means counts the NULL packets on the overwritten-side TS; the packet counting means counts post-extraction NULL packets on the TS side adding packets through overwriting; the comparing means compares the former NULL-packet count value (represented by "CNULL") with the latter packet count value (represented by "CN"); and the NULL-packet-priority specifying means performs overwriting to NULL-packet areas with priority when CNULL≧CNP, i.e., when the number of the NULL packets to be overwritten is sufficient. As a result, the overwriting can be efficiently performed.

As a preferable mode, based on the seventh problem-solving means, in a fifteenth problem-solving means, the packet-overwriting means is configured such that when a detection frequency of NULL packets in an overwritten-side TS is high, the NULL-packet areas are given priority as overwrite objects; and concurrently, when overwriting of the extracted packets to NULL packets is suspended, and the number of packets held pending for the overwriting reaches a predetermined value, the overwriting thereof is executed to other unnecessary-packet areas.

This problem-solving means operates and provides effects as follows. The packet-overwriting means detects NULL packets on the overwritten-side TS. When the detection frequency thereof is relatively high, and the number of the NULL packets is sufficient, the packet-overwriting means does not perform the specific processing as described below, but performs overwriting to the NULL-packet areas with priority.

In contrast, when the detection frequency of the NULL packets is relatively low, and the number of the NULL packets to be overwritten is short, the overwriting is suspended, and the number of packets held pending for the overwriting is thereby increased.

In the case where the number of the pending packets is equal to or larger than a predetermined value, when the overwriting is performed only to the NULL-packet areas, packets on the side where packets are added tend to excessively concentrates within a predetermined time interval.

To prevent the above, when the number of the pending packets reaches the predetermined value, the overwriting thereof is permitted to be executed to unnecessary-packet areas other than the NULL-packet areas. Thereby, the packets can be appropriately distributed and arranged, thereby making the rear-stage TS-separating section to be advantageous.

Based on the first problem-solving means, a sixteenth problem-solving means is configured such that a plurality of TSs including packets to be multiplexed through either the overwriting or the insertion are input as objects, the plurality of TSs being selectable from (a) a TS including viewing-desired broadcast program data, (b) a TS including broadcast-program-table related data, (c) a TS including downloadable data, (d) a TS including image-recording-desired broadcast program data, and (e) TSs including other broadcast program data; and packets in the plurality of selected TSs are multiplexed. This is equivalent to the configuration of the above-described individual problem-solving means that would be described at a different view angle.

According to this problem-solving means, as already described, the digital-broadcast reception mode can be significantly enriched in variety.

Thereby, regardless of which TS includes an image-and/or-audio involving broadcast program, a broadcast program table, downloadable data, and information of a data broadcast such as an electronic music delivery, screen-viewing, broadcast-program-table display, downloading, data-broadcast reception, multiscreen display, and the like can be arbitrarily combined and displayed at the same time.

For example, digital-broadcast reception rich in variety can be implemented such that while a broadcast program is viewed, a broadcast program table included in a TS different from a TS including the aforementioned broadcast program is displayed; while a broadcast program is viewed, a broadcast program included in the second TS is image-recorded; while a broadcast program is viewed, data such as a program included in the second TS is downloaded; while a broadcast program is viewed, data broadcast program included in the second TS is received; while a broadcast program is image-recorded, data such as a program included in the second TS is downloaded; while a broadcast program is image-recorded, data broadcast program included in the second TS is received; and while a data broadcast program is received, data such as a program included in the second TS is downloaded.

BRIEF DESCRIPTION OF THE DRAWINGS

These and objects as well as advantages of the invention will become clear by the following description of preferred embodiments of the invention with reference to the accompanying drawings, wherein:

FIGS. 18A and 18B are views for explaining operation of the digital broadcast receiving apparatus according to the third preferred embodiment;

FIGS. 19A and 19B are views for explaining operation of the digital broadcast receiving apparatus according to the fourth preferred embodiment;

FIG. 20 is a block diagram showing a practical configuration of a multiplexer section of the digital broadcast receiving apparatus according to the fifth preferred embodiment;

FIG. 22 is a view (continued from FIG. 21) for explaining the operation of the digital broadcast receiving apparatus according to the fifth preferred embodiment;

FIG. 23 is a view (continued from FIG. 22) for explaining the operation of the digital broadcast receiving apparatus according to the fifth preferred embodiment;

DETAILED DESCRIPTION OF THE INVENTION

Hereinbelow, referring to the accompanying drawings, preferred embodiments of the present invention will be described.

First Preferred Embodiment

A first preferred embodiment is configured such that multiplexing of packets in plural TSs for arbitrary broadcast programs (contents) is performed by "overwriting". As an operation example, a description will be made with reference to the case of multiplexing of a viewing-desired broadcast program and a broadcast program table.

Figure 1:
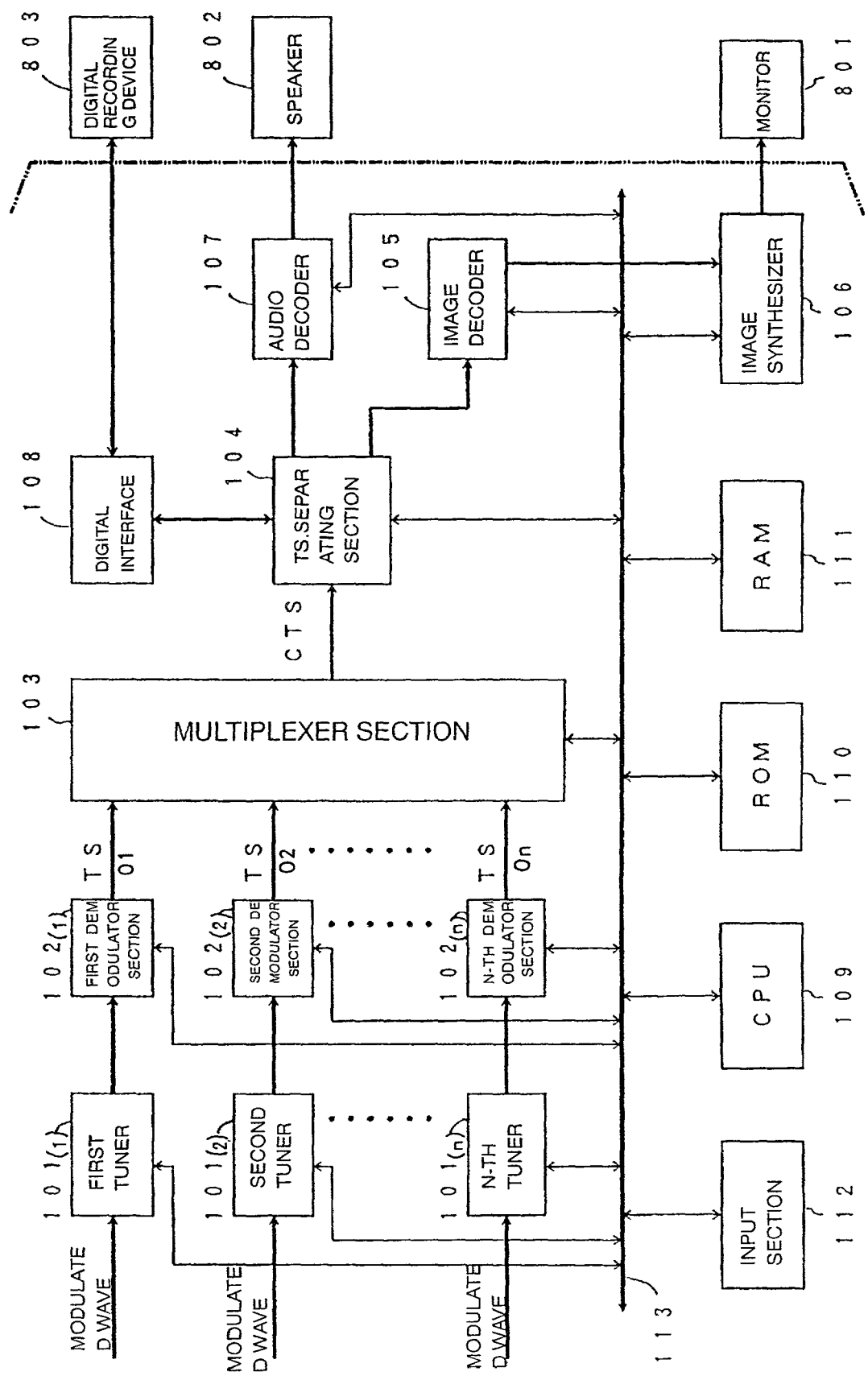
FIG. 1 is a block diagram showing a practical configuration of a digital broadcast receiving apparatus that is common to first to seventh preferred embodiments of the present invention.
Figure 2:
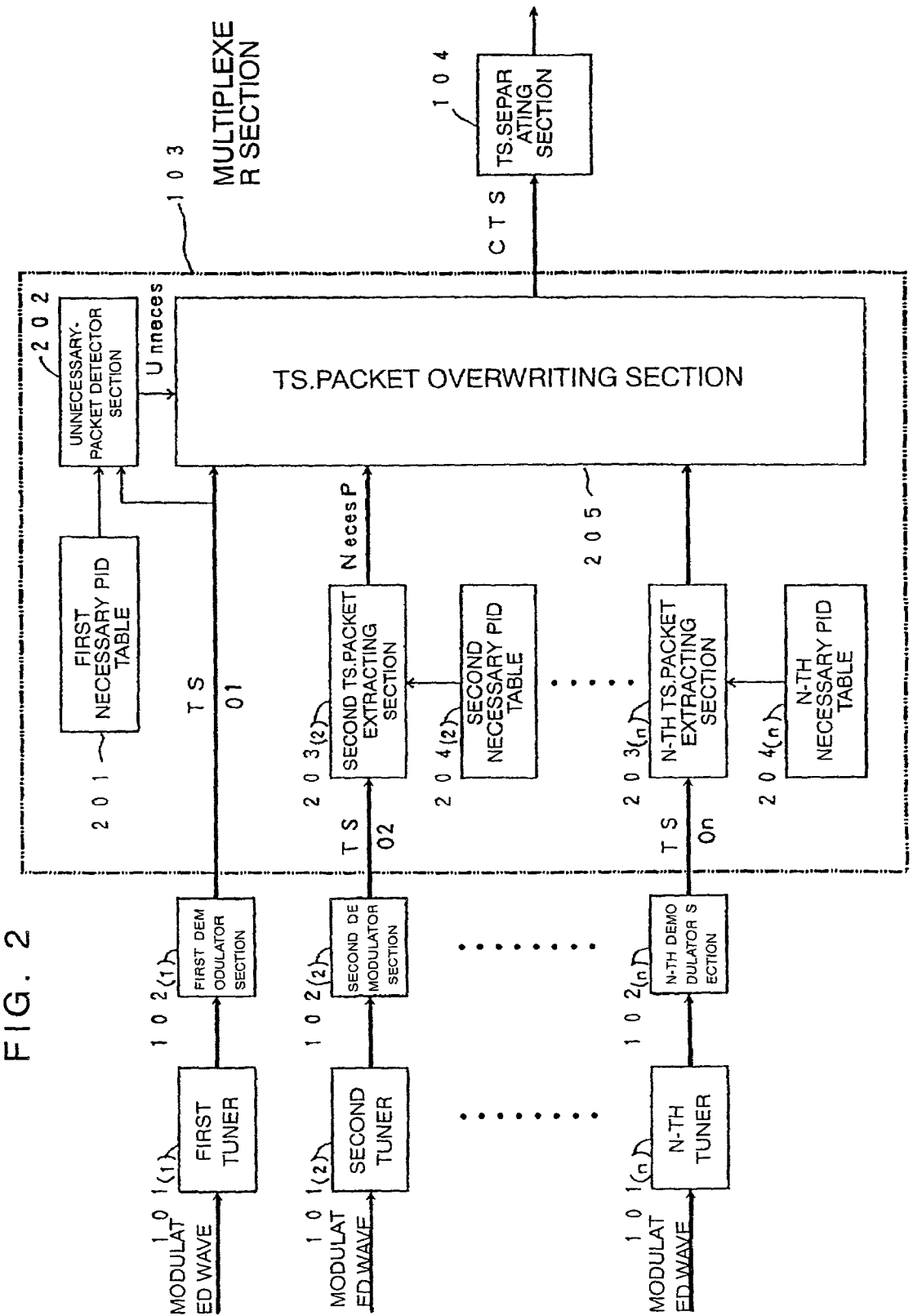
FIG. 2 is a block diagram showing a practical configuration of a multiplexer section of the digital broadcast receiving apparatus according to the first preferred embodiment.

FIG. 1 is a block diagram showing a practical configuration of the digital broadcast receiving apparatus according to the first preferred embodiment of the present invention. FIG. 1 is common to second to seventh preferred embodiments described below. FIG. 2 is a block diagram showing a practical configuration of a multiplexer section according to the first preferred embodiment.

In FIG. 1, reference numeral $101(i)$ (i=1, 2, ..., n (natural number)) denotes each of first to n-th tuners provided corresponding to modulated waves in mutually different channels (transmission lines; tranponders or frequency bands) of mutually different digital-broadcasting methods.

Reference numeral $102(i)$ denotes each of first to n-th demodulator sections provided corresponding to the first to n-th tuners $101(i)$. The first to n-th demodulator sections perform demodulation corresponding to modulation methods individually regulated by the digital-broadcasting methods, and concurrently, perform error correction to thereby output individual TSs conforming to MPEG-2 (MPEG: moving picture coding experts group).

Reference numeral 103 denotes a multiplexer section for extracting necessary packets from plural TSs, which have been input from the first to n-th demodulator sections and multiplexing them, to thereby generate a single custom transport stream (which may be referred to as a "CTS", hereinbelow).

The multiplexer section 103 extracts necessary packets from plural TSs according to packet identifiers (each of which may be referred to as a "necessary PID") set as required by a user. Reference numeral 104 denotes a TS-separating section for separating object packets specified by the user from the CTS that has been input from the multiplexer section 103.

Reference numeral 105 denotes an image decoder for decoding a new image stream generated by the separating section to thereby generate image information. Reference numeral 106 denotes an image synthesizer for combining the image information and service information to thereby generate image signals.

Reference numeral 107 denotes an audio decoder for decoding a new audio stream generated through the separation to thereby generate audio signals. Reference numeral 108 denotes a digital interface (such as an IEEE1394 interface) for outputting separated transport information.

Reference numeral 109 denotes a CPU for totally controlling the receiver. The reference numeral 110 denotes a ROM (read-only memory) for storing software programs. Reference numeral 111 denotes a RAM (random access memory) that serves as a working memory.

Reference numeral 112 denotes an input section including front-panel buttons and a remote-control transmitter. Reference numeral 113 denotes a bus for connecting the individual sections to the CPU 109, as shown in FIG. 1. For the ROM 110, a rewritable nonvolatile memory, such as a flash memory, is preferably used; however, it is not limited thereto.

The digital broadcast receiving apparatus is configured including the above.

FIG. 1 shows other configuration members. A monitor 801 is connected to the image synthesizer 106 and generates images from an image signal stream and displays images on its screen.

A speaker 802 is connected to the audio decoder 107 and converts audio signal stream to audio and outputs audio. A digital recording device 803 is connected to the digital interface 108 and records transport information.

FIG. 2 shows a practical example configuration of the multiplexer section 103.

In the figure, a first demodulator section 102(1) outputs a first TS 01 to a packet-overwriting section 205. Reference numeral 201 denotes a first necessary PID (packet identifier) table that is used for registering a PID used for extracting a necessary packet for viewing-desired broadcast program from the first TS•01. (Hereinbelow, a PID of an unnecessary packet in a TS may be referred to as an "unnecessary PID".)

Reference numeral 202 denotes an unnecessary-packet detector section for comparing a PID registered in the first necessary-PID table 201 to a PID of a packet included in the first TS•01 to thereby extract an unnecessary PID included in the first TS•01, and then detects an unnecessary-packet area TS00 corresponding to the unnecessary PID.

Reference numerals 203(2) to 203(n) denote second to n-th packet-extracting sections, respectively, which are used for extracting necessary packets from second to n-th TSs 02 to 0n that are output, respectively, from second to n-th demodulator sections 102(2) to 102(n).

Reference numerals 204(2) to 204(n) denote second to n-th necessary PID tables that are used to register PIDs required for extracting necessary packets regarding contents desired to acquire from the individual second to n-th TSs 02 to 0n. Reference numeral 205 denotes the packet-overwriting section 205, as mentioned above.

Figure 3:
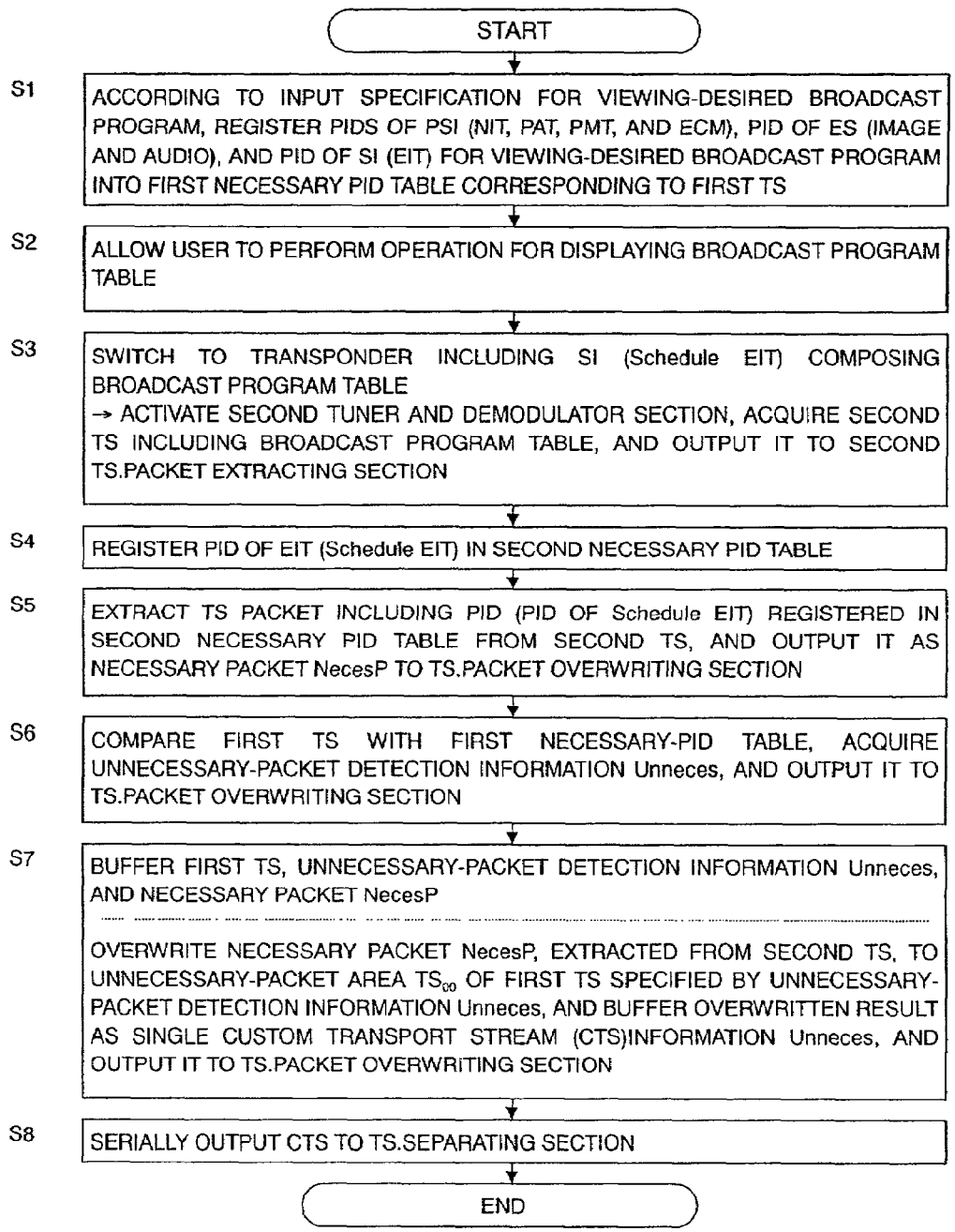
FIG. 3 is a flowchart for explaining operation of the digital broadcast receiving apparatus according to the first preferred embodiment.

Hereinbelow, referring to a flowchart in FIG. 3 and an operation-explanatory view in FIG. 4, operation of the first preferred embodiment will be described. As an example for describing the operation, the number of CS-digital broadcast TSs to be acquired is assumed to be two.

The first TS•01 is assumed to include a viewing-desired-broadcast-program signal stream, an audio signal stream, and a data signal stream; and the second TS•02 is assumed to include broadcast-program layout information (SI) for forming a scheduled broadcast program table.

That is, a description will be made regarding operation in the case where, while the viewing-desired broadcast program and the broadcast program table are transmitted via different TSs, both viewing of the viewing-desired broadcast program and acquisition (display) of the broadcast program table are simultaneously implemented. The following description regarding the operation conforms to MPEG-2.

(STEP 1)

When a viewing-desired broadcast program is specified by a user through the input section 112, the CPU 109 registers corresponding packet PIDs in the table 201 according to a software program stored in the ROM 110 and user-specification information that has been input through the input section 112.

The PIDs to be registered are a PID of a packet including an image signal stream, an audio signal stream, a data signal stream (i.e., elementary stream (ES) signals) that compose the viewing-desired broadcast program; and a PID of a packet including program specific information (PSI) and SI.

The PSI includes a network information table (NIT), a program association table (PAT), a program map table (MAP), and an entitlement control message (ECM). The SI includes an event information table (EIT) required for presenting the title, date, content, and the like of a broadcast program. A PID of thereof is represented by "0x0012" ("0x" represents hexadecimal decimals).

Specifically, the aforementioned NIT associates transmission-line information with an organization channel, and a PID of the packet is "0x0010". The PAT is used to acquire PIDs of packets through which PMTs are transmitted, and a PID of the packet is "0x000". The PMT is used to acquire PIDs of packets through which an image signal stream, an audio signal stream, and a data signal stream are transmitted; and a PID thereof is described in the PAT. The ECM is used to descramble broadcast program, and a PID thereof is described in the PMT.

Hereinbelow, example configurations of the aforementioned tables will be described.

The NIT is configured as follows. For a TS number "1", a transmission source is a horizontally polarized wave of 11.20 GHz; and service number lists are "3", "5", . . . . For a TS number "2", a transmission source is a horizontally polarized wave of 11.23 GHz; and service number lists are represented by "9", "10", . . . .

The NIT is repeatedly transmitted in units of 1 sec. The same NIT is repeatedly transmitted to all the TSs. The NIT is always monitored by the digital broadcast receiving apparatus.

The PAT is configured as follows. A PID of a PMT for service number "3ch" is described as "0x20"; and PIDs of service numbers "5ch" and "7ch" are respectively described as "0x21" and "0x22".

The PAT is repeatedly transmitted in units of 100 msec so as to be prepared for PAT-updating that is performed according to changes in service. The PAT is always monitored by the digital broadcast receiving apparatus.

The PMT is configured as follows. For "image #1", a PID of an ES is described as "0x30", and a PID of an ECM is described as "0x40". For "audio #1", a PID of an ES is described as "0x31", and a PID of an ECM is described as "0x41". The PMT is repeatedly transmitted in units of 100 msec so as to be prepared for PMT-updating that is performed according to changes in the ES.

The PMT is always monitored by the digital broadcast receiving apparatus.

Each value of PIDs of the NIT, the PAT, and the EIT is fixed. However, each value of PIDs of the PMT, the ECM, an image signal stream, and an audio signal stream is variable.

Figure 4:
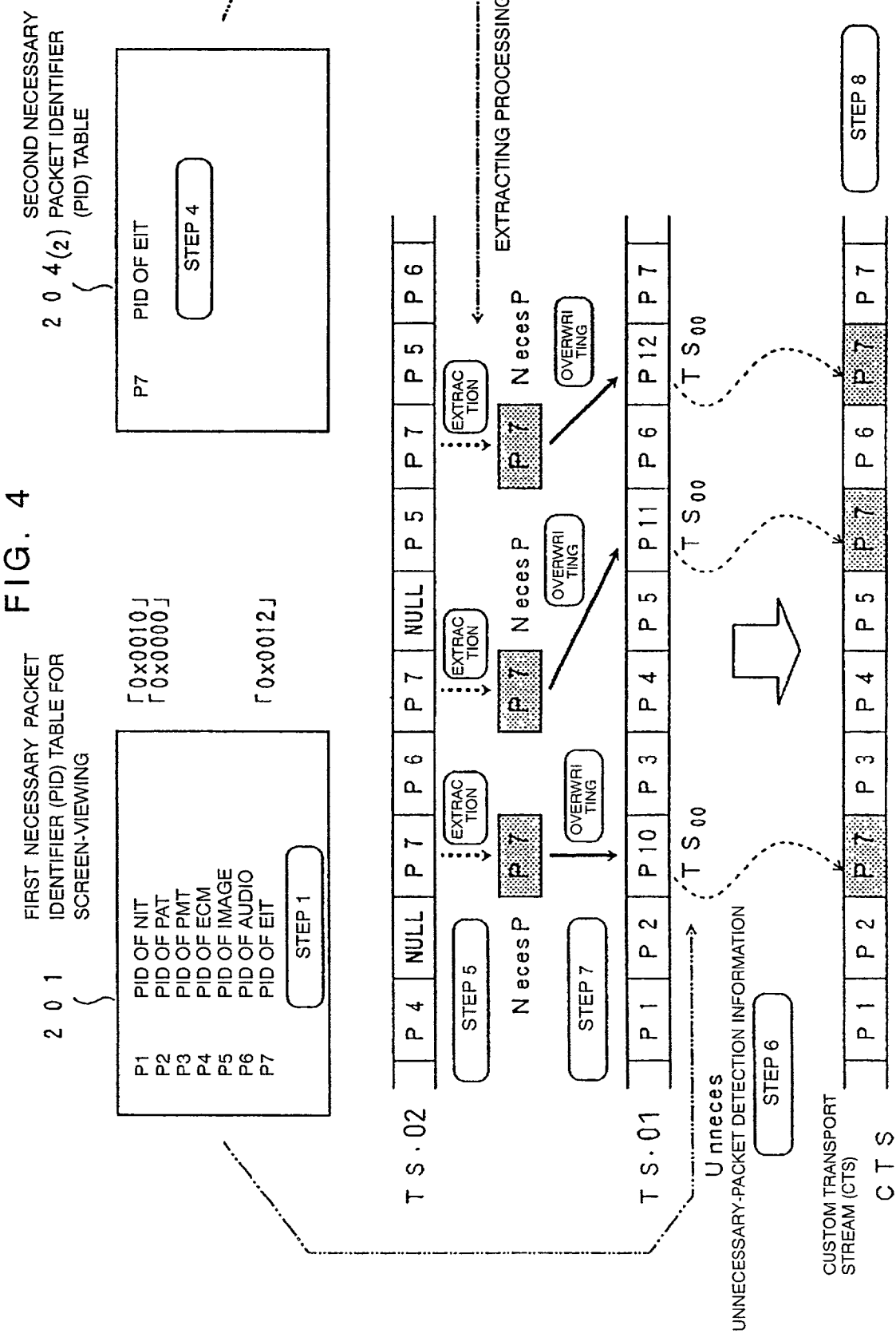
FIG. 4 is a view for explaining the digital broadcast receiving apparatus according to the first preferred embodiment.

In FIG. 4, the PID of the NIT is represented by "P1". Similarly, the PID of the PAT, the PID of the PMT, the PID of the ECM, the PID of the image signal stream for the viewing-desired broadcast program, the PID of the audio signal steam therefor, and the PID of the EIT are represented by "P2", "P3", "P4", "P4", "P5", "P6", and "P7", respectively. In step 1, these PIDs P1 to P7 are registered in the table 201.

(STEP 2)

The user operates the input section 112 to specify display of a broadcast program table. The broadcast program table is a list table of digital-broadcast programs for a period of, for example, one week or two weeks.

(STEP 3)

According to the specification given from the input section 112, the CPU 109 commands the tuner 101(2) to switch to a transponder through which SI composing a broadcast program table is transmitted. The SI in this case is a schedule EIT.

That is, the CPU 109 acquires the NIT in the TS-separating section 104 from TS•01 that includes the viewing-desired broadcast program. The CPU 109 analyzes the NIT; detects an identifier of a TS through which the schedule EIT is transmitted; acquires transmission-line information corresponding to the aforementioned TS identifier; sets it to, for example, the second tuner 101(2); and thereby controls the second demodulator section 102(2) to be active.

As a result, a modulated wave of the channel selected by the tuner 101(2) is demodulated by the demodulator section 102(2) into a TS conforming to MPEG-2, and the TS is output to the extracting section 203(2). The above TS is the second TS•02 including the broadcast program table. In the above, the TS including the broadcast program table may be received by a different tuner.

(STEP 4)

As shown in FIG. 4, the CPU 109 registers P7, which represents the PID of the schedule EIT, in the table 204(2).

(STEP 5)

The extracting section 203(2) extracts a packet having the PID P7 of the schedule EIT registered in the table 204(2) from TS•02, and outputs the packet as a necessary packet NecesP to the packet-overwriting section 205.

FIG. 4 shows a state where the necessary packet having the PID P7; that is, only the schedule EIT, is extracted and is output to the packet-overwriting section 205.

(STEP 6)

The unnecessary-packet detector section 202 compares the input TS•01 with the first unnecessary-PID table 201; detects a packet having a PID not written from TS•01 into the table 201 for registration; and feeds unnecessary-packet information Unneces, which is a result of the detection, to the packet-overwriting section 205.

In FIG. 4, unnecessary-packet areas TS00 identified by P10, P11, and P12 in TS•01 are not related to any one of P1 to P7 that have been registered in the table 201.

Therefore, the detector section 202 generates detection information Unneces for the unnecessary-packet areas TS00 identified with P10, P11, and P12, and outputs the unnecessary-packet information Unneces to the packet-overwriting section 205.

(STEP 7)

The overwriting section 205 receives the input of the first TS•01 from the first demodulator section 102(1), and receives the input of the unnecessary-packet detection information Unneces from the detector section 202. In addition, it receives the input of a post-extraction necessary packet (an EIT packet corresponding to PID=P7) from the extracting section 203 (2). Then, the overwriting section 205 buffers these inputs.

Subsequently, the overwriting section 205 overwrites the necessary packet extracted from TS•02 and sent to the unnecessary-packet area TS00 of the first TS•01 specified in the unnecessary-packet information, and buffers a new TS generated through the overwriting. The newly generated TS is used as a CTS (custom transport stream).

FIG. 4 shows a state where the packets P7 of the EIT, extracted from TS•02, are overwritten to the unnecessary-packet areas TS00 individually identified by P10, P11, and P12 in TS•01.

(STEP 8)

The new single CTS is thus generated by the overwriting method and buffered in the packet-overwriting section 205; and such CTSs successively generated and buffered in that manner are serially output to the TS-separating section 104.

According to the operation of the sequence described above, the CTS includes not only the image signal stream, the audio signal stream, and the data signal stream for composing the specified viewing-desired broadcast program, but also the SI for forming the specified broadcast program table.

The separating section 104 separates the packet of an image signal stream for the user-specified broadcast program from the CTS, and outputs the separated packet as an image stream to the image decoder 105. Similarly, the separating section 104 separates the packet of an audio signal stream for the broadcast program from the CTS, and outputs the packet as an audio stream to the audio decoder 107.

Moreover, the separating section 104 transfers the SI for composing the broadcast program table to the RAM 111. The SI stored in the RAM 111 is transferred by the CPU 109. On the other hand, the image decoder 105 decodes the image stream, decodes the stream, thereby generates image information, and transmits the information to the image synthesizer 106.

Upon receipt of the image information, the image synthesizer 106 combines the image information and the broadcast-program-table information together, thereby generates image signals, and outputs the image signals to the monitor 801. Also, the audio decoder 107 decodes the audio stream, thereby generates an audio signal stream, and outputs it to the speaker 802.

In the above, the operation has been described with reference to the example case where multiplexing is performed for the combination of the viewing-desired broadcast program data and the broadcast-program layout information. However, multiplexing may be performed for arbitrary combinations among various data and information such as viewing-desired broadcast program data, broadcast-program layout information, image-recording-desired broadcast program data, downloadable data, and data-broadcast broadcast program data.

Practical combination examples include a combination of screen-viewing and image-recording, a combination of screen-viewing and downloading, a combination of screen-viewing and data-broadcast reception, and a combination of image-recording and downloading.

In addition, for multiscreen display, combination examples include the combination of screen-viewing and screen-viewing, image-recording and data-broadcast reception, a combination of image-recording and image-recording, a combination of downloading and data-broadcast reception, a combination of downloading and downloading, and a combination of data-broadcast reception and data-broadcast reception.

Furthermore, some other items of broadcast data/information may be added to the aforementioned individual combination of the two items. That is, not only simple multiplexing of a combination of two TSs, the configuration may be built such that multiplexing of an arbitrary combination of three or more TSs is executed.

Such a way of arbitrary combination is applicable to all the remaining preferred embodiments of the invention, which will be described below.

Figure 5:
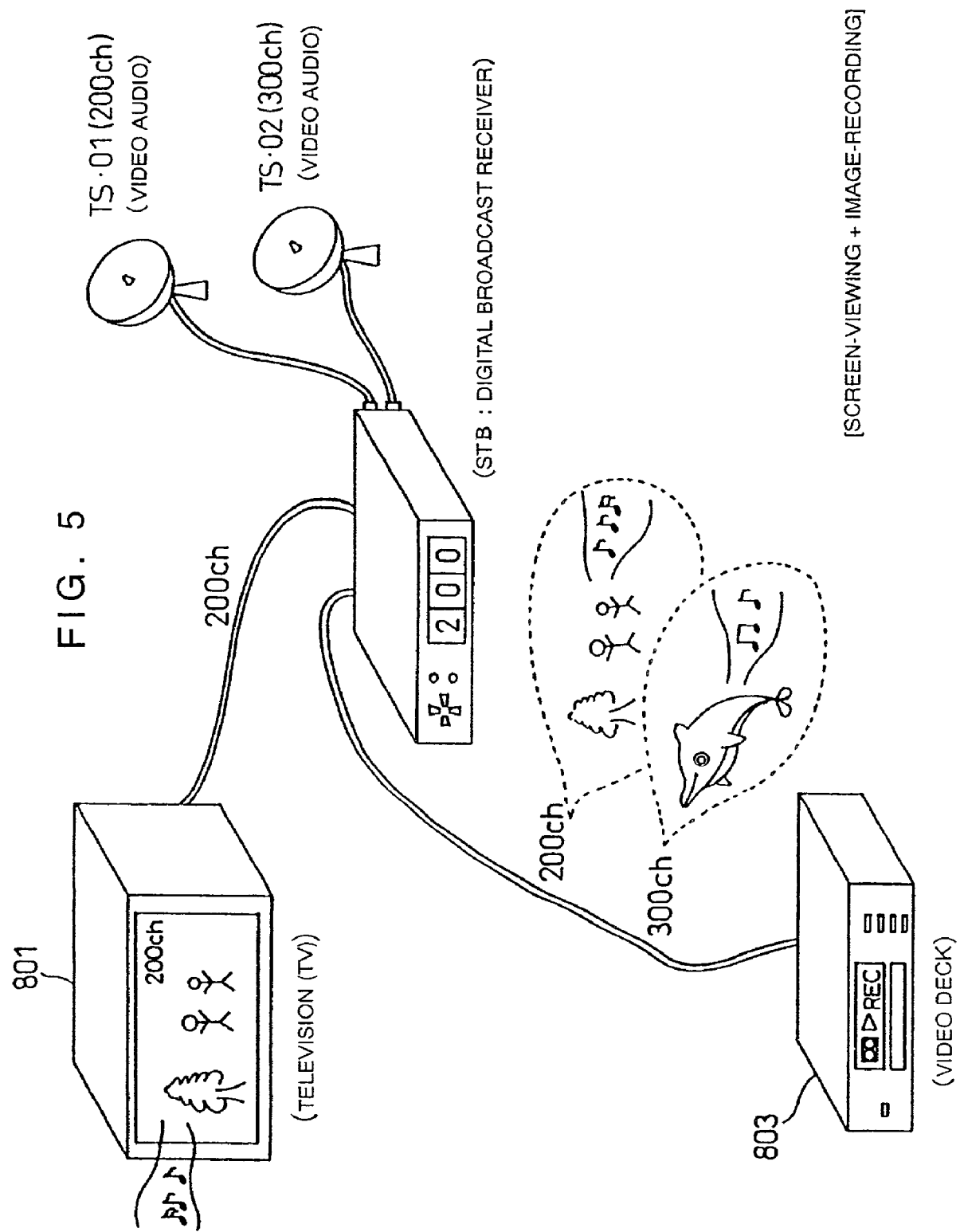
FIG. 5 is a conceptual view showing an example "creen-viewing+image-recording" state of the digital broadcast receiving apparatus according to the present invention.
Figure 6:
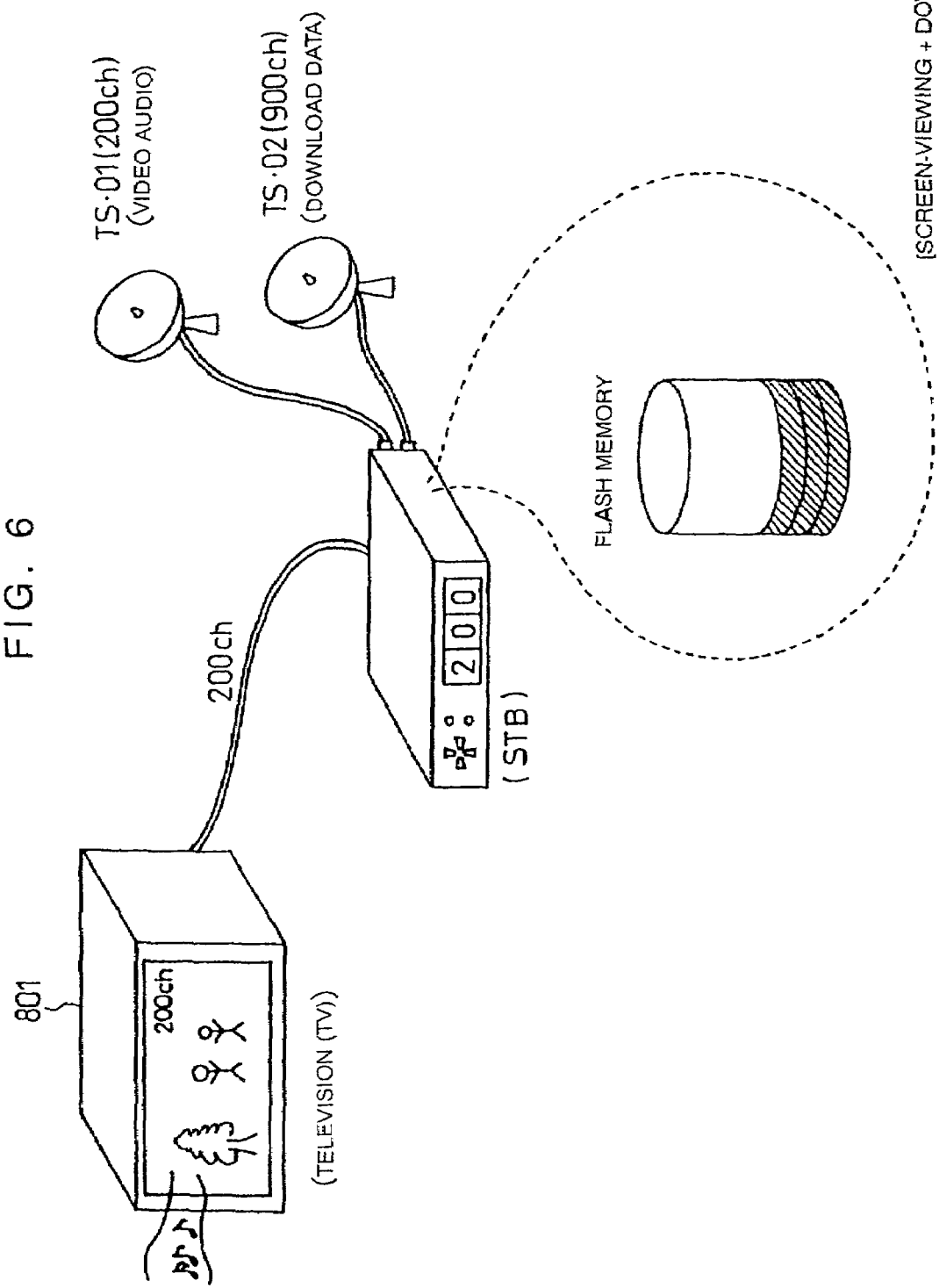
FIG. 6 is a conceptual view showing an example "screen-viewing+downloading" state of the digital broadcast receiving apparatus according to the present invention.
Figure 7:
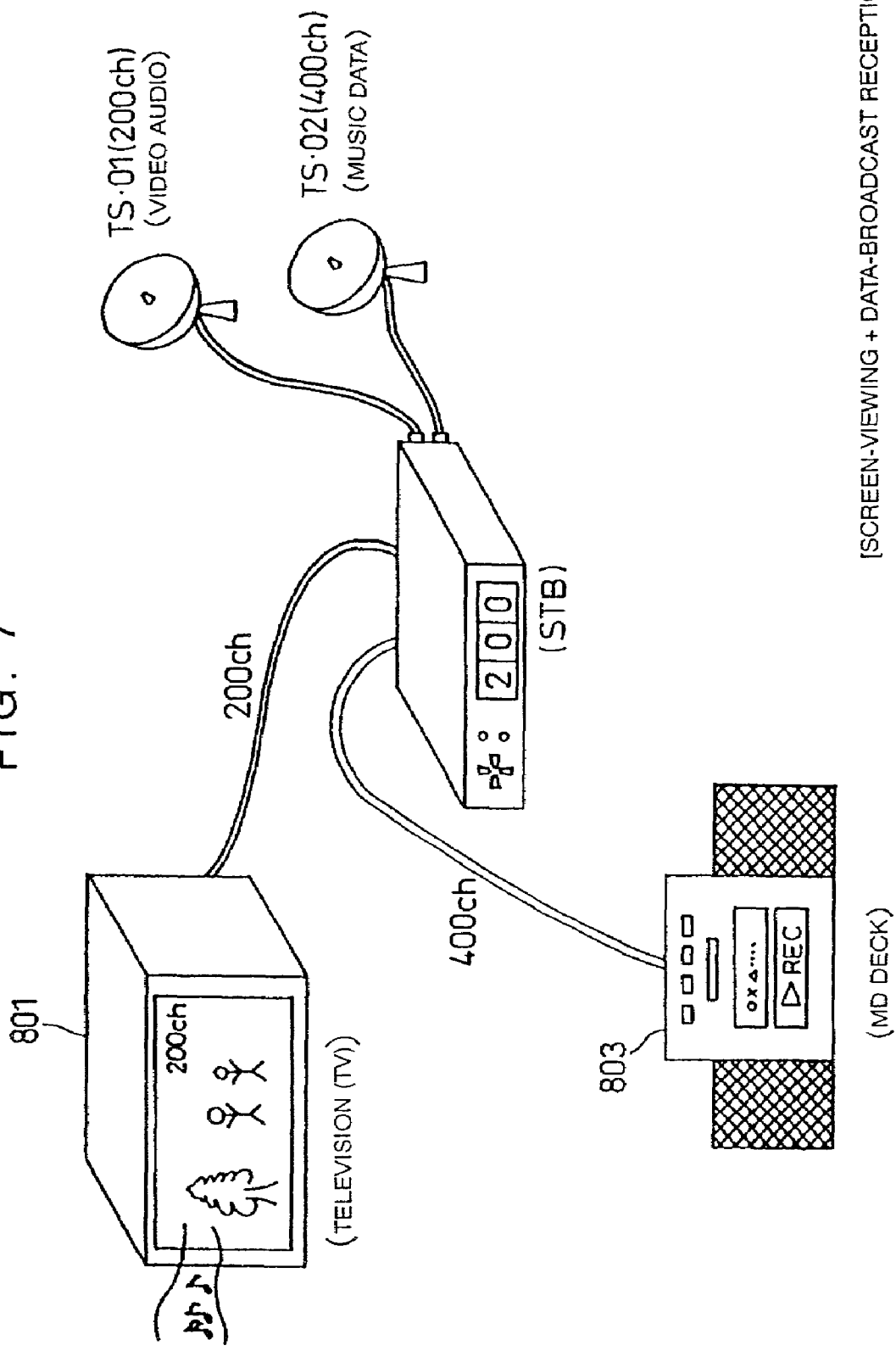
FIG. 7 is a conceptual view showing an example "screen-viewing+data-broadcast-program reception" state of the digital broadcast receiving apparatus according to the present invention.
Figure 8:
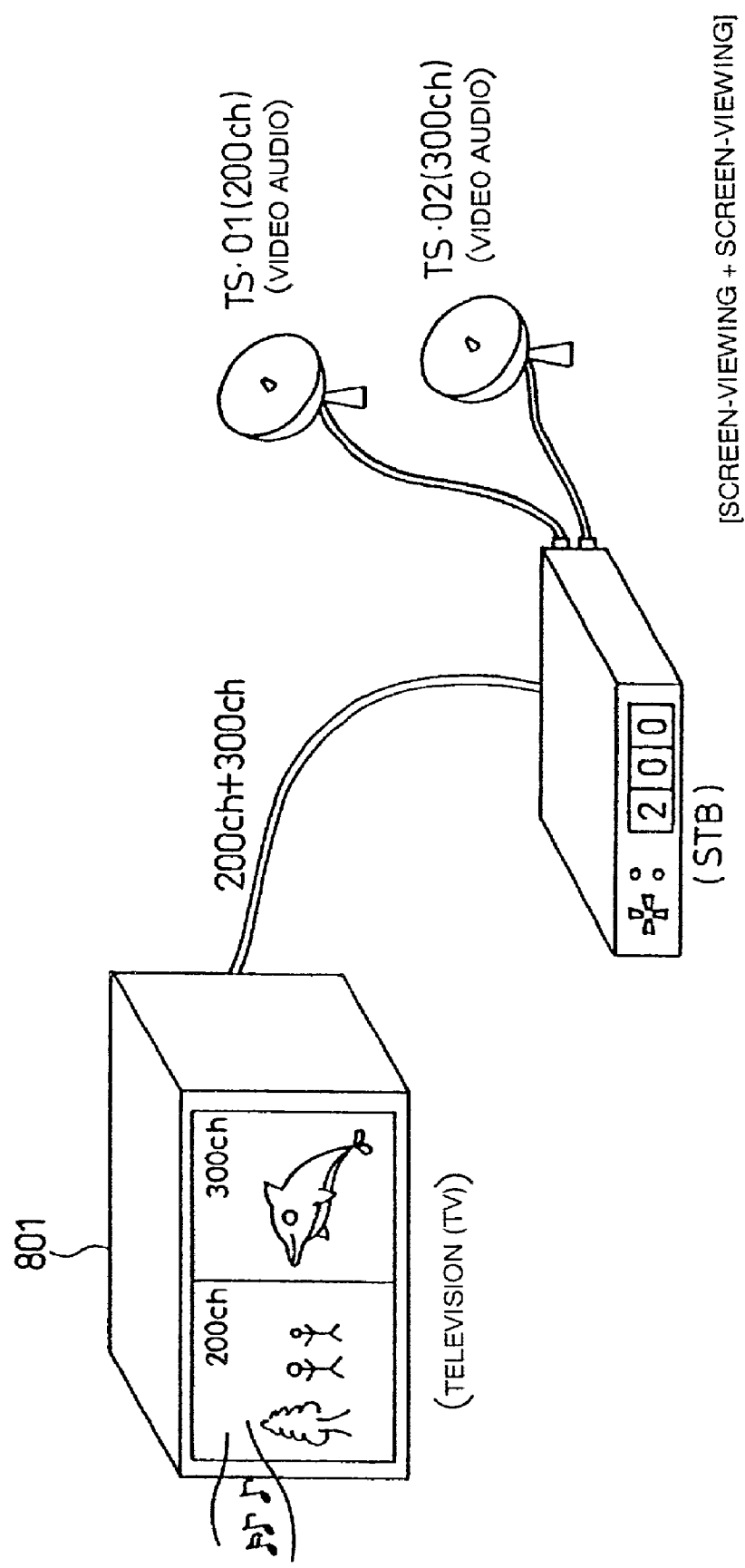
FIG. 8 is a conceptual view showing an example "screen-viewing+screen-viewing" state of the digital broadcast receiving apparatus according to the present invention.

FIGS. 5 to 8 show various example combinations of reception of broadcast data/information. FIG. 5 shows the state of "screen-viewing+image-recording". FIG. 6 shows the state of "screen-viewing+downloading". FIG. 7 shows the state of "screen-viewing+data-broadcast broadcast program reception". FIG. 8 shows the state of "screen-viewing+screen-viewing".

Second Preferred Embodiment

A second preferred embodiment is configured such that arbitrary broadcast programs in plural TSs are multiplexed by overwriting; and when intended packets having identical PIDS, the PIDs are converted to different PIDs, and multiplexing of the packets is thereafter executed.

The second preferred embodiment is of one of preferred modes. Hereinbelow, example operations of the second preferred embodiment will be described with reference to a combination of a viewing-desired broadcast program and an image-recording-desired broadcast program.

Figure 9:
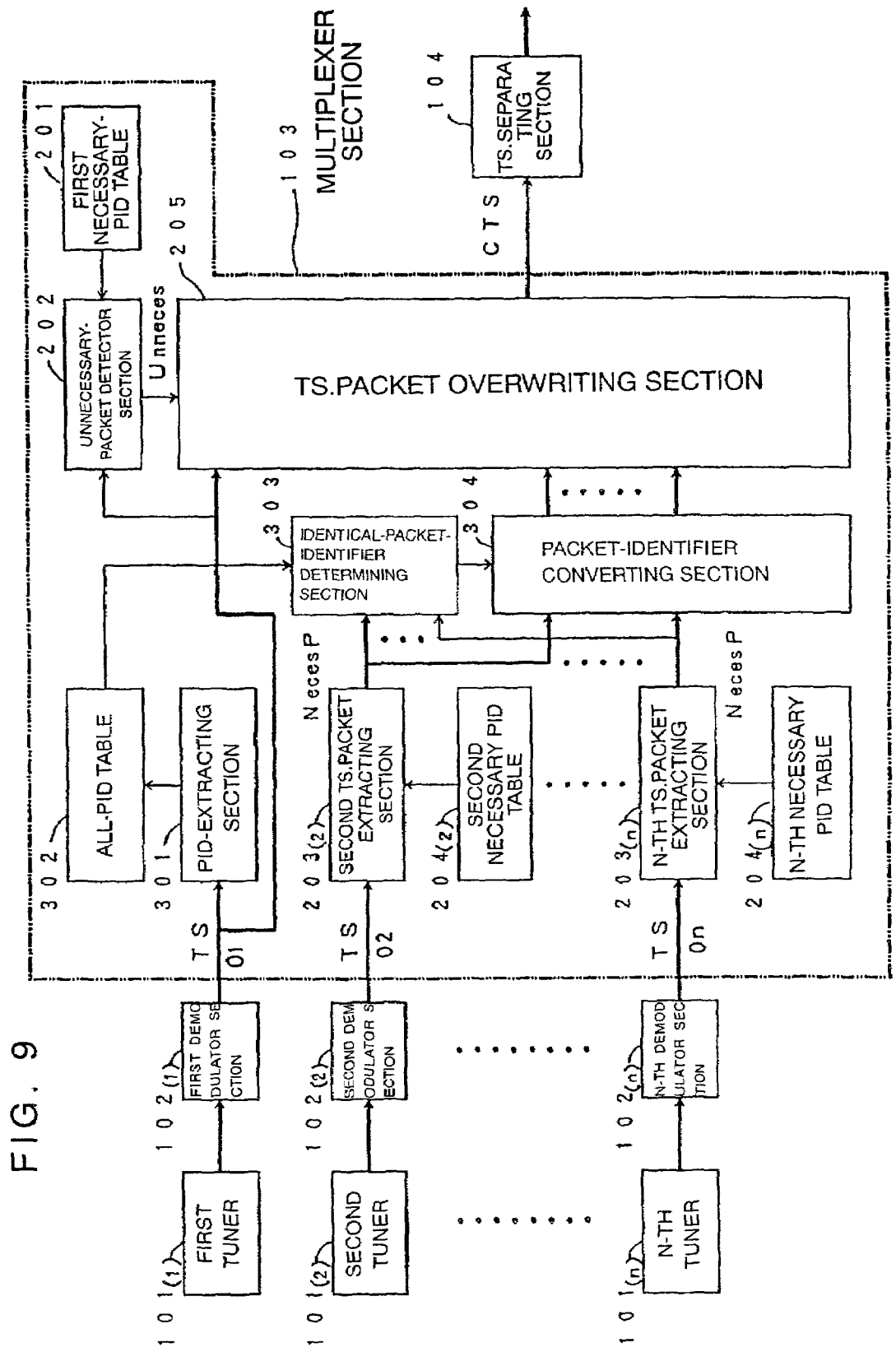
FIG. 9 is a block diagram showing a practical configuration of a multiplexer section of the digital broadcast receiving apparatus according to the second preferred embodiment.
Figure 10:
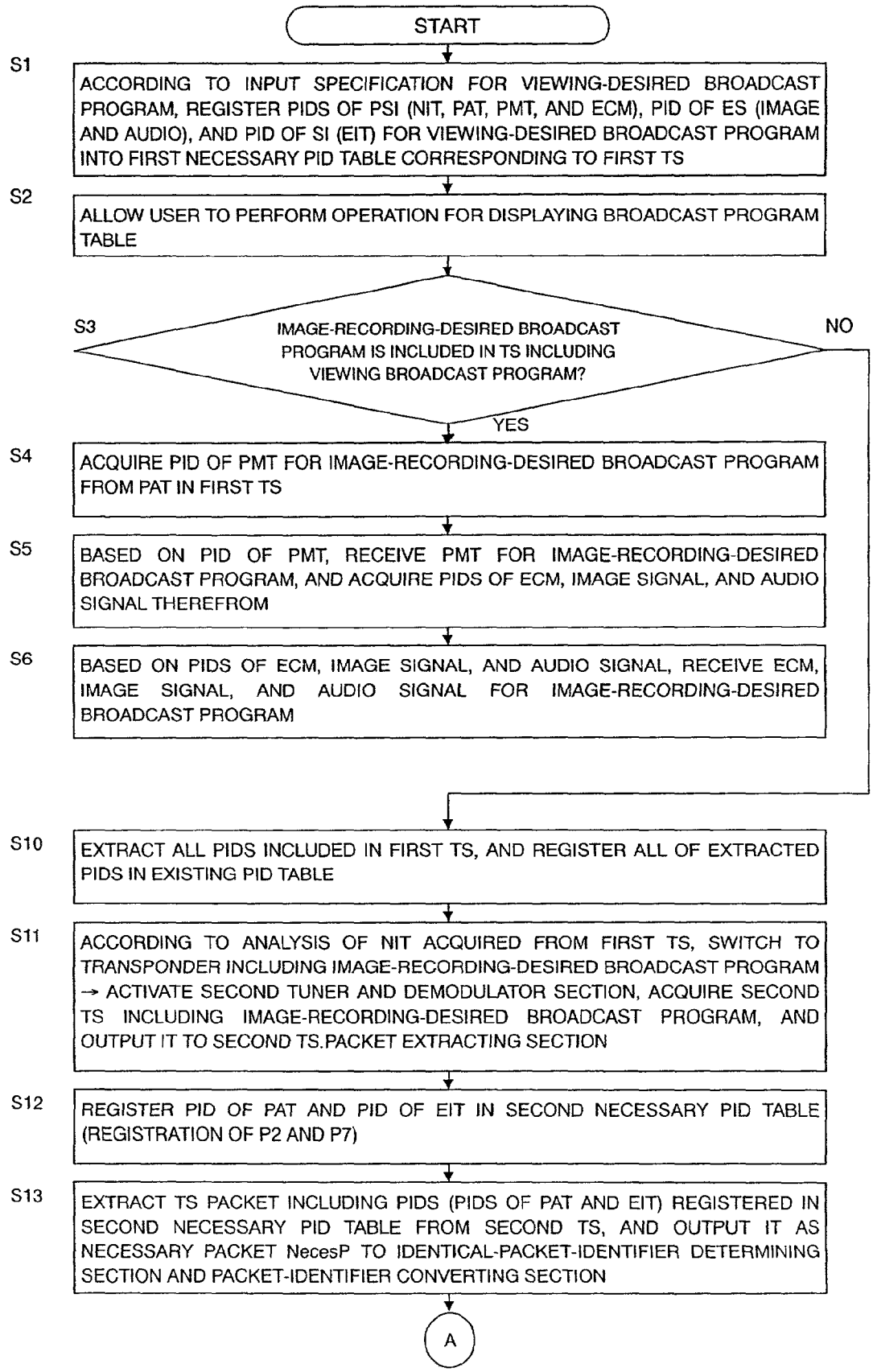
FIG. 10 is a flowchart for explaining operation of the digital broadcast receiving apparatus according to the second preferred embodiment.
Figure 11:
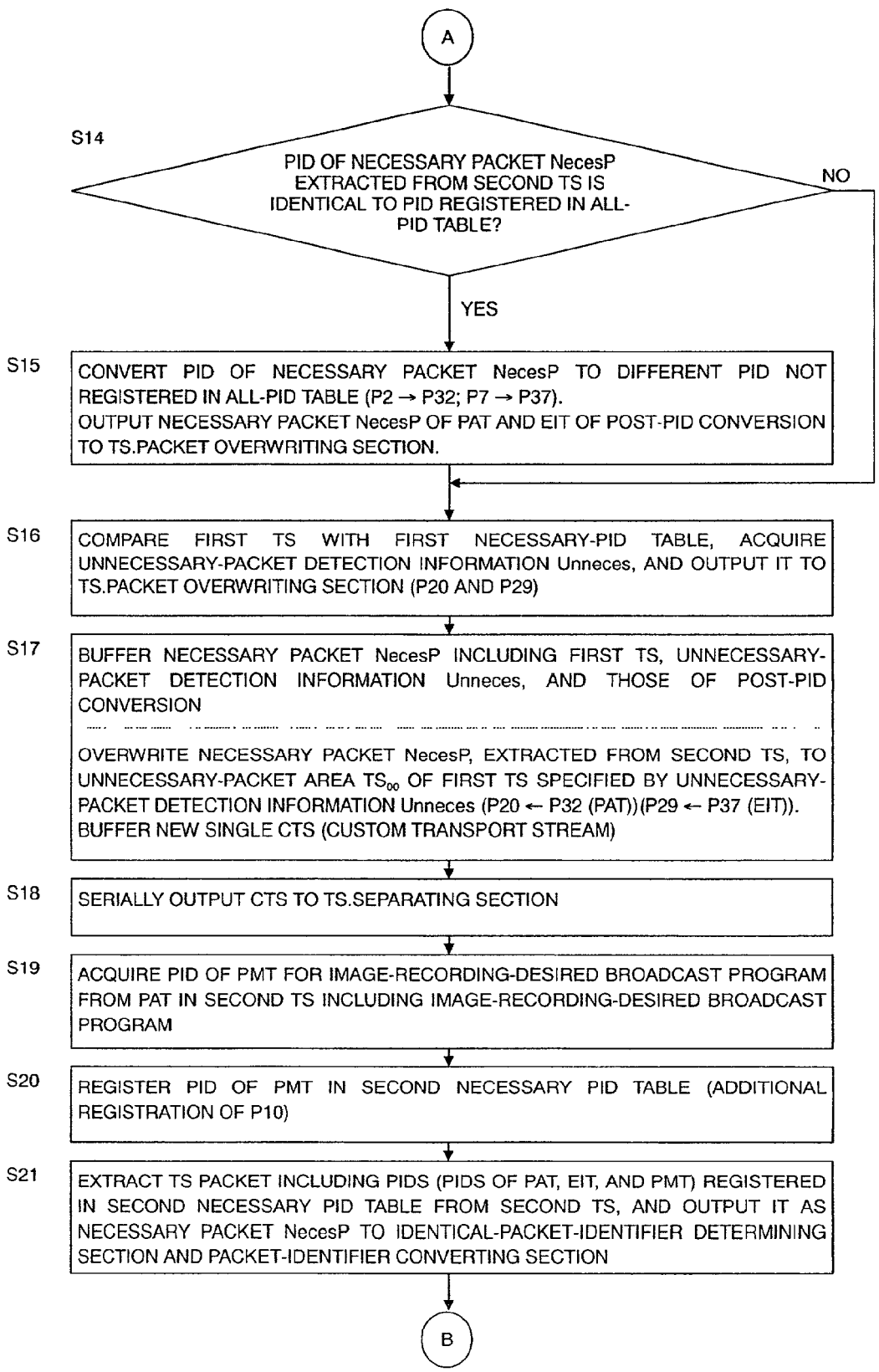
FIG. 11 is a flowchart (continued from FIG. 10) for explaining the operation of the digital broadcast receiving apparatus according to the second preferred embodiment.
Figure 12:
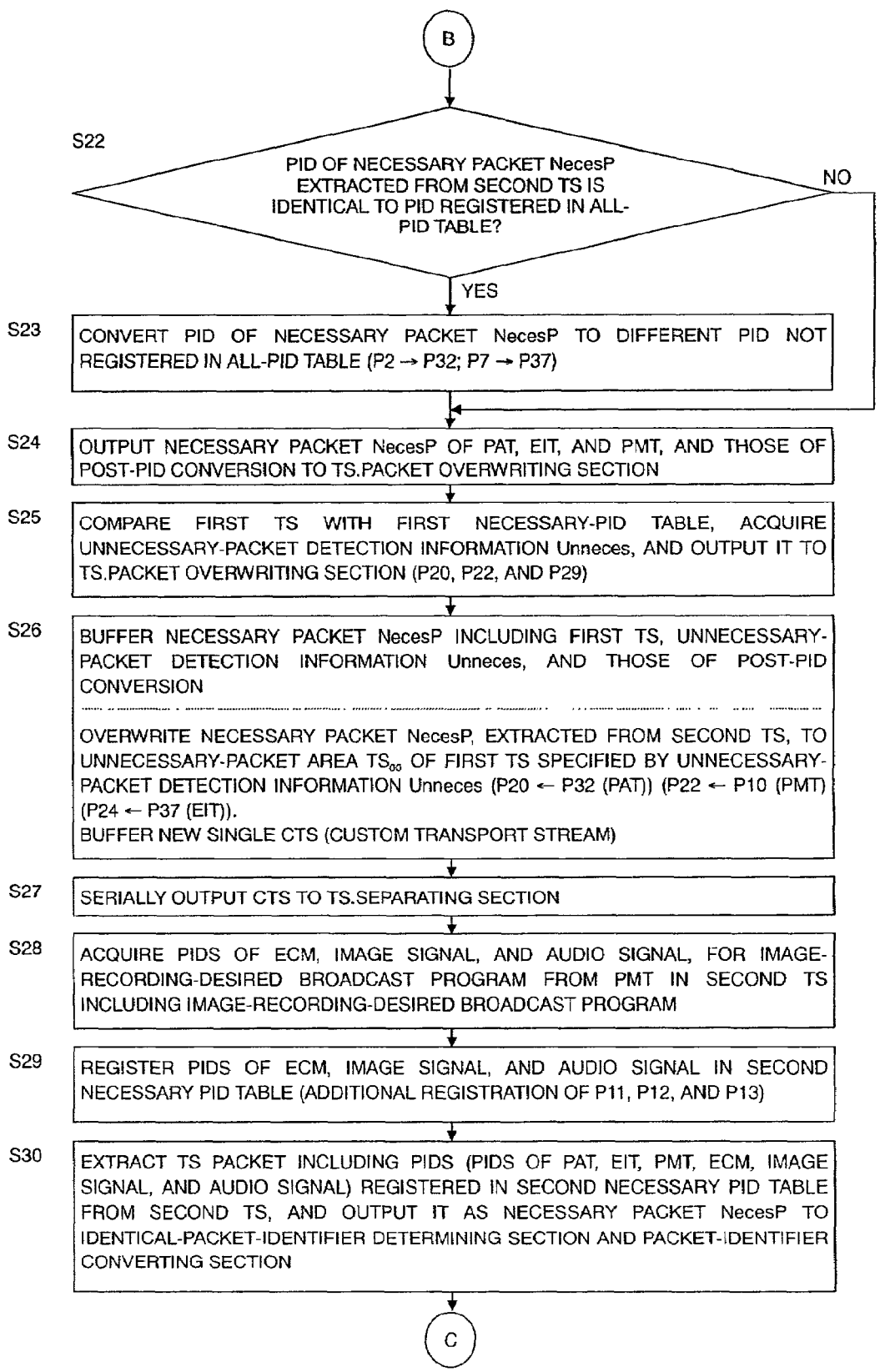
FIG. 12 is a flowchart (continued from FIG. 11) for explaining the operation of the digital broadcast receiving apparatus according to the second preferred embodiment.
Figure 13:
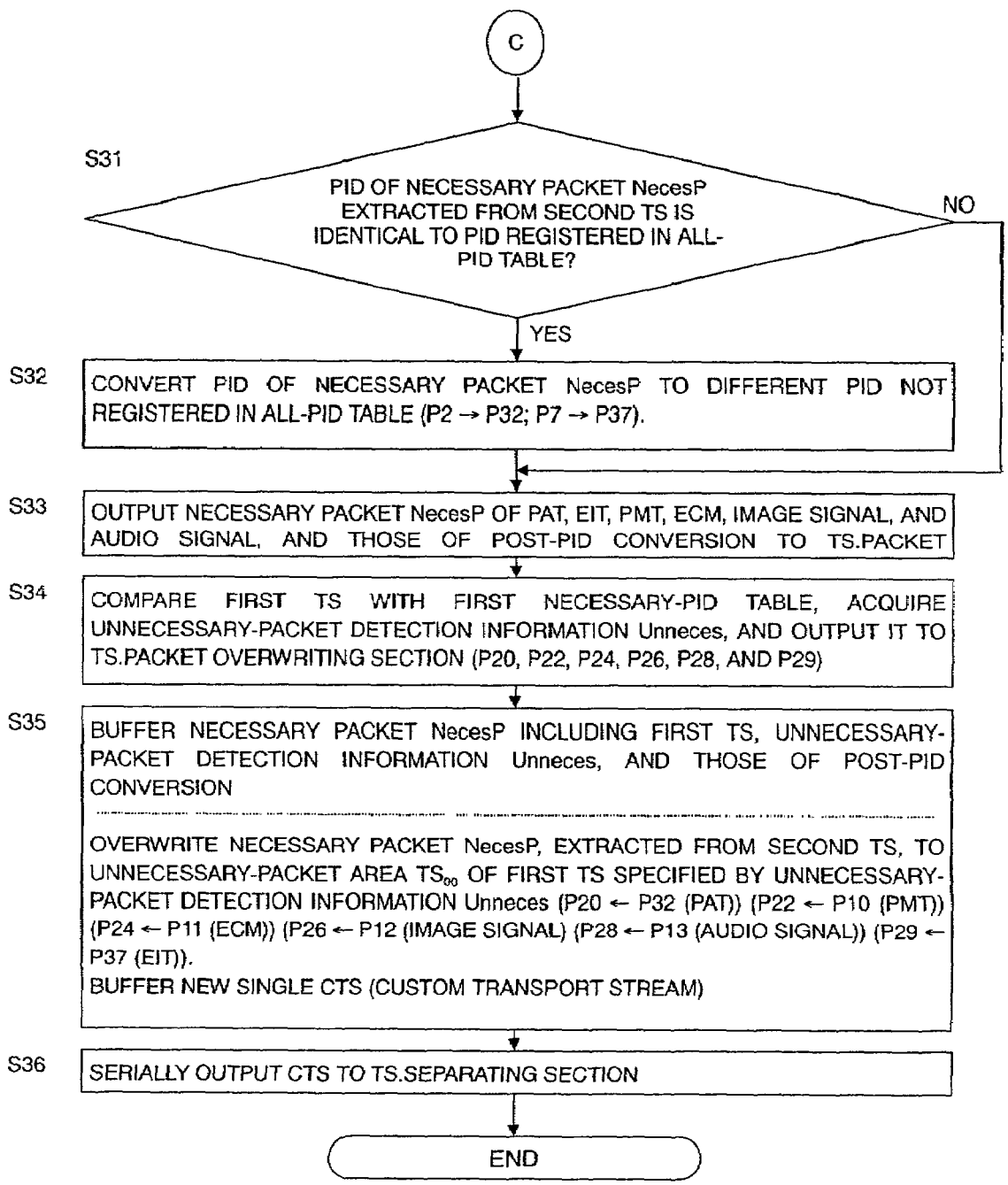
FIG. 13 is a flowchart (continued from FIG. 12) for explaining the operation of the digital broadcast receiving apparatus according to the second preferred embodiment.

FIG. 9 is a block diagram showing a practical configuration of a multiplexer section of a digital broadcast receiving apparatus according to the second preferred embodiment. The basic configuration thereof is shown in FIG. 1.

In FIG. 9, reference numeral 301 denotes a PID-extracting section for extracting all PIDs included in TS•01 received from the first demodulator section 102(1).

Reference numeral 302 denotes an all-PID table for registering all PIDs extracted by the extracting section 301. Reference numeral 303 denotes an identical-PID determining section for determining whether a PID of a necessary packet NecesP in the state of post-extraction by the second to N-th packet-extracting sections 203(2) to 203(n) is identical to any one of PIDs registered in the table 302.

Reference numeral 304 denotes a PID-converting section. When the determining section 303 determines the PIDs as mentioned above to be identical to each other, the PID-converting section 304 converts the PIDs of the post-extraction necessary packets to different PIDs unregistered in the table 302, and then transmits the packets to the packet-overwriting section 205.

In contrast, when the two are determined to be different from each other, the PIDs of the post-extraction necessary packets are not converted, and the packets as in the extracted states are passed through the PID-converting section 304 and transmitted to the packet-overwriting section 205.

Other potions in the configuration are the same as those in the first preferred embodiment (shown in FIG. 2). Therefore, using the same reference numerals and symbols as those in the first preferred embodiment, repetitious description thereof is omitted.

Hereinbelow, operation of the digital broadcast receiving apparatus according to the second preferred embodiment will be described referring to flowcharts in FIGS. 10 to 13 and operation-explanatory views in FIGS. 14 to 16.

(STEP 1)

Step 1 is similar to the case in the first preferred embodiment. That is, as shown in FIG. 14, a table 201 is used to register respective PIDs P1 to P7 of a NIT, a PAT, a PMT, an ECM, an image signal stream, an audio signal stream, and an EIT.

(STEP 2)

A user operates the input section 112 and thereby specifies an image-recording-desired broadcast program.

(STEP 3)

The CPU 109 determines whether the specified image-recording-desired broadcast program is included in a TS including a viewing-desired broadcast program. If it is included therein, processing proceeds to step 4; whereas if it is not included therein, processing proceeds to step 7.

(STEP 4)

As a result of the determination in step 3, if an image-recording-desired broadcast program is determined to include in TS•01 for a viewing-desired broadcast program, processing proceeds to the present step 4. In step 4, a PID of a PMT for the specified image-recording-desired broadcast program is acquired from a PAT in TS•01.

(STEP 5)

The system receives a PMT regarding the image-recording-desired broadcast program, and acquires PIDs of an ECM, an image signal stream, and an audio signal stream from the PMT.

(STEP 6)

According to the PIDs received in step 5, the system receives corresponding ECM, image signal stream, and audio signal stream.

Note that, for the convenience of descriptions regarding preferred embodiments to be made in later portion, steps 7 to 9 are not presented to in this Specification.

(STEP 10)

As a result of the determination in step 3, if a specified image-recording-desired broadcast program is not included in TS•01 for a viewing-desired broadcast program, processing proceeds to step 10.

In step 10, the PID-extracting section 301 receives all PIDs included in TS•01, which has been input from the demodulator section 102(1); then, the PIDs are registered in the table 302. FIG. 14 shows a state where PIDs P1 to P7, P20, P22, P24, P26, P28, and P29 are registered in the table.

(STEP 11)

Step 11 is similar to step 3 in the first preferred embodiment. That is, through switching to a transponder through which the specified image-recording-desired broadcast program is transmitted, TS•02 including the specified program is output to the extracting section 203(2) via the demodulator section 102(2).

(STEP 12)

Figure 14:
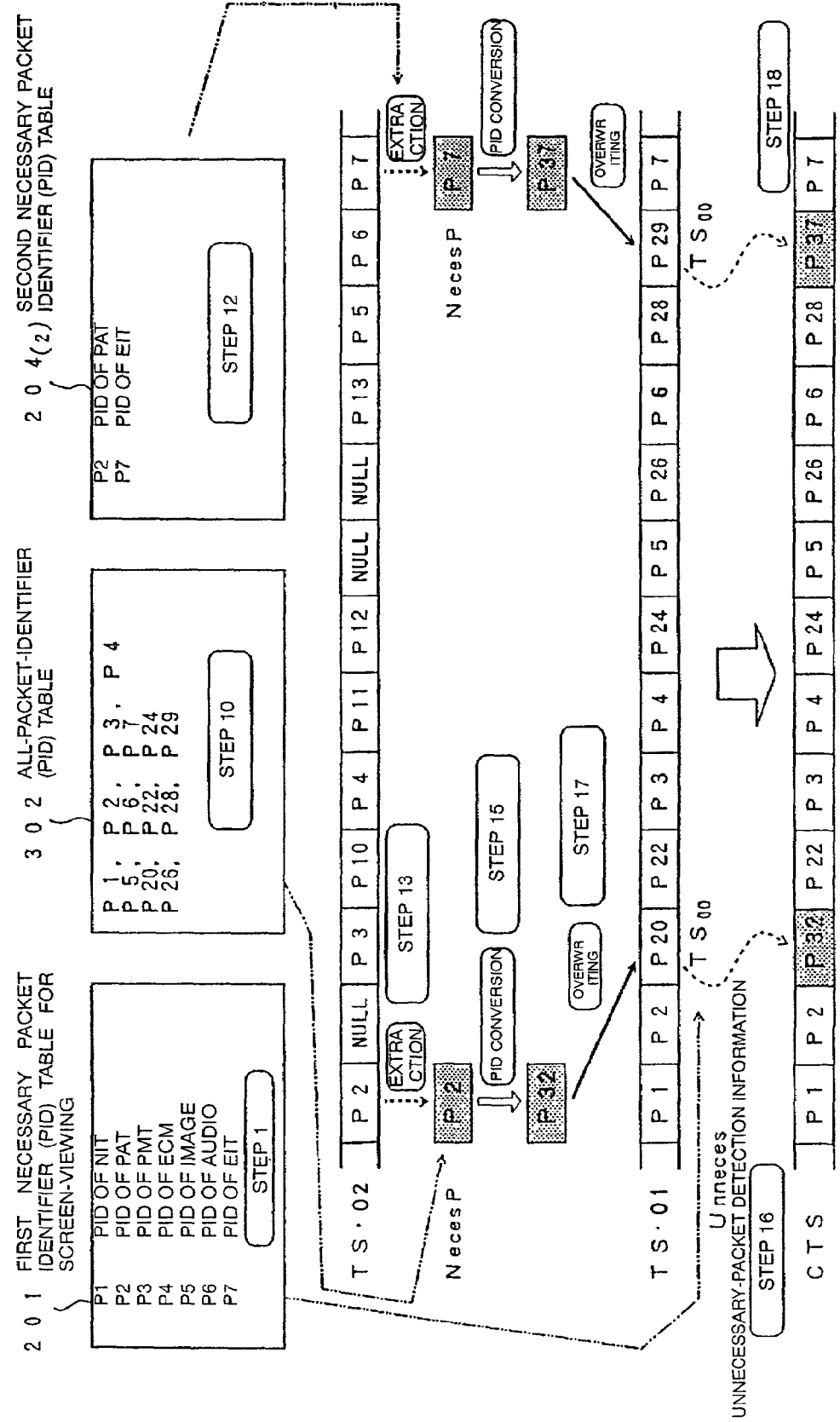
FIG. 14 is a view for explaining the operation of the digital broadcast receiving apparatus according to the second preferred embodiment.

As shown in FIG. 14, the CPU 109 selectively registers a PID of the upper-ranked PAT, that is, P2, in PSI for the image-recording-desired broadcast program, and the PID of the EIT (SI), that is, P7.

In this case, the viewing-desired broadcast program and the image-recording-desired broadcast program have common data values for the PID of the PAT the PID of the EIT; that is, the PIDs are duplicated. In specific, the PIDs thereof are registered as P2 and P7 in both the table 201 and the table 204(2).

(STEP 13)

The extracting section 203(2) for inputting TS•02 extracts packets having the PIDs of the PAT and the EIT, which are registered in the table 204(2), from TS•02. It then outputs the extracted packets as necessary packets NecesP to the determining section 303 and the converting section 304.

FIG. 14 shows a state where only PAT and EIT packets respectively corresponding to P2 and P7 are extracted. (STEP 14)

The determining section 303 determines whether PIDs P2 and P7 of the necessary packets NecesP, which have been input from the extracting section 203(2), are identical to PIDs registered in the table 302.

If the PIDs are identical to each other, processing proceeds to step 15; whereas, if the PIDs are not identical to each other, processing proceeds to step 16.

(STEP 15)

When the PIDs are duplicated, the converting section 304 converts the individual PIDs P2 and P7 of the extracted packets to different PIDs that can be identified from each other and that are unregistered in the table 302. FIG. 14 shows an example state where P2 is converted to P32, and P7 is converted to P37.

Then, the necessary packets NecesP of the PAT and the EIT having the post-conversion PIDs P32 and P37 are transmitted to the packet-overwriting section 205.

(STEP 16)

The detector section 202 compares the input TS•01 with the first unnecessary-PID table 201; detects a packet having a PID not written from TS•01 into the table 201 for registration; and feeds unnecessary-packet information Unneces, which is a result of the detection, to the packet-overwriting section 205.

In FIG. 14, the unnecessary-packet areas TS00 identified by PIDs, for example, P20 and P29 in TS•01 are not related to any one of P1 to P7 that have been registered in the table 201.

Therefore, the detector section 202 generates detection information Unneces for the unnecessary-packet areas TS00 identified with the PIDs P20 and P29, and outputs the unnecessary-packet information Unneces to the packet-overwriting section 205.

(STEP 17)

The overwriting section 205 receives the input of the first TS•01 from the first demodulator section 102(1), the input of the unnecessary-packet detection information Unneces from the detector section 202, and in addition, inputs of the post-extraction necessary packets NecesP from the extracting section 203(2).

Then, the overwriting section 205 buffers these inputs. Subsequently, the overwriting section 205 overwrites the necessary packets NecesP extracted from TS•02 to the unnecessary-packet areas TS00 of the first TS 01 specified in the unnecessary-packet information Unneces, and buffers a new TS generated through the overwriting.

FIG. 14 shows a state where the packet P32 of the PAT and the packet P37 of the EIT, which have been extracted from TS•02, are individually overwritten to the unnecessary-packet areas TS00 individually identified by the PIDs P20 and P29 in TS•01.

(STEP 18)

The new single CTS is thus generated by the overwriting method and buffered in the packet-overwriting section 205; and such CTSs successively generated and buffered in that manner are serially output to the TS-separating section 104.

(STEP 19)

A PID of a PMT for the image-recording-desired broadcast program is acquired from the PAT in TS•02 including the image-recording-desired broadcast program currently being received. The acquisition is carried out in the TS-separating section 104.

(STEP 20)

The PMT PID acquired in step 19 is registered in the table 204(2). In an example state in FIG. 15, the PMT PID is shown as P10. Therefore, in the example state, the respective PIDs P2, P7, and P10 of the PAT, the EIT, and the PMT for the image-recording-desired broadcast program are registered in the table 204(2).

Ordinarily, for a viewing-desired broadcast program and an image-recording-desired broadcast program, PIDs of PMTs in P3 and P10 are different from each other. However, they can be identical to each other.

(STEP 21)

The extracting section 203(2), which receives the input of TS•02, extracts packets having PIDs of the PAT, the EIT, and the PMT, which have been registered in the table 204(2), from TS•02. Then, it outputs the PIDs as necessary packets NecesP to the determining section 303 and the converting section 304.

Figure 15:
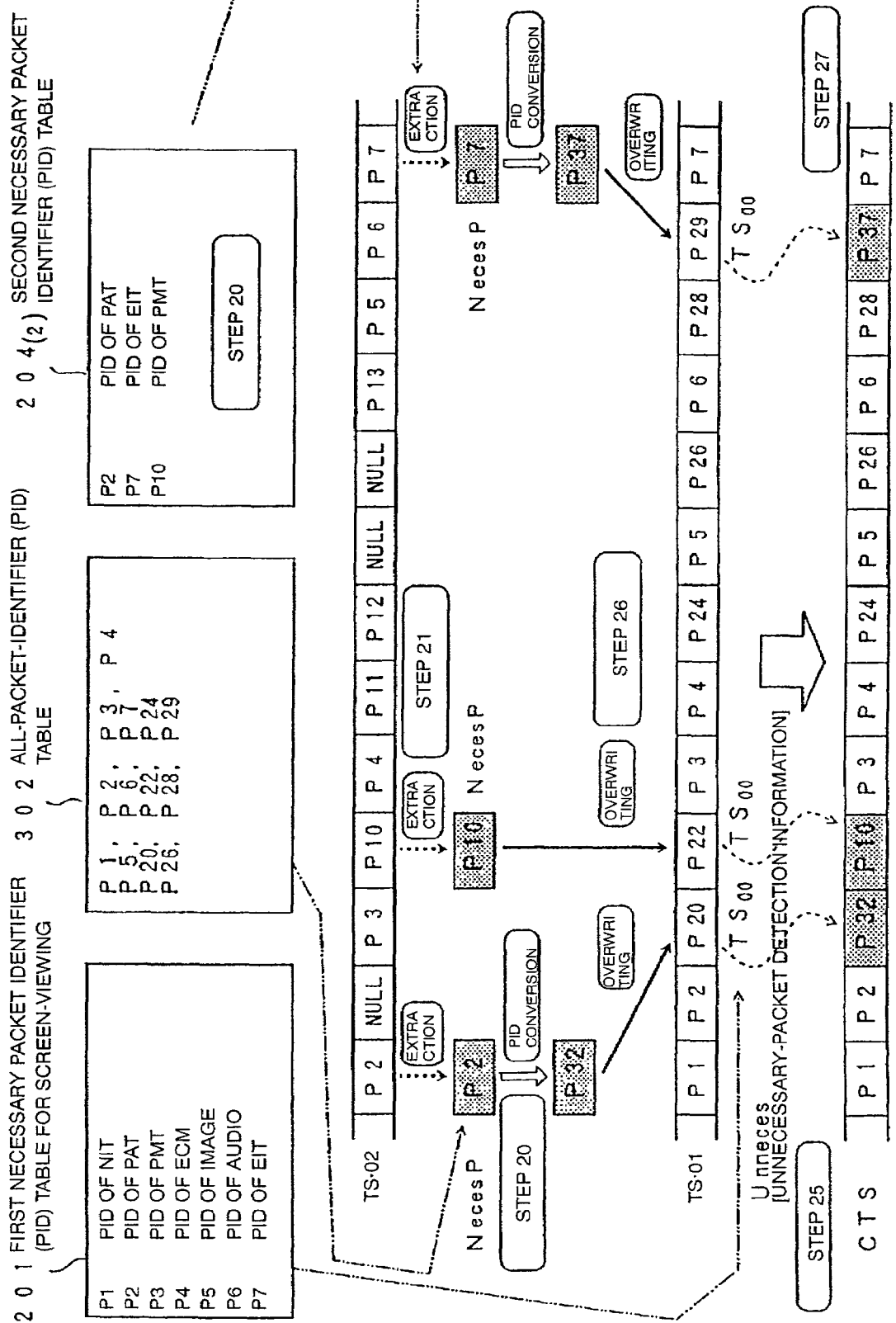
FIG. 15 is a view (continued from FIG. 14) for explaining the operation of the digital broadcast receiving apparatus according to the second preferred embodiment.

FIG. 15 shows a state where only the packets of the PAT, the EIT, and the PMT, which are individually identified by P2, P7, and P10, are extracted.

(STEP 22)

The determining section 303 determines whether the PIDs P2, P7, and P10 of the necessary packets NecesP, which have been input from the extracting section 203(2), are identical to PIDs registered in the table 302. If the PIDs are determined identical, processing proceeds to step 23; whereas if the PIDs are determined not identical, processing proceeds to step 24. Processing proceeds to step 23 for P2 and P7; whereas processing skips to step 24 for P10.

(STEP 23)

When the PIDs are duplicated, the converting section 304 performs processing similar to step 15. It converts P2 to P32, and converts P7 to P37. At this time, if P10 is identical to P3, the converting section 304 performs identifier conversion also for P10.

(STEP 24)

The necessary packets NecesP of the PAT and the EIT having the post-identifier-conversion PIDs P32 and P37, and the necessary packet NecesP of the PMT for which identifier conversion has not been performed are transmitted to the overwriting section 205.

(STEP 25)

The detector section 202 compares the input TS 01 with the first unnecessary-PID table 201; detects a packet having a PID not written from TS•01 into the table 201 for registration; and feeds unnecessary-packet information Unneces, which is a result of the detection, to the packet-overwriting section 205.

In FIG. 15, the unnecessary-packet areas TS00 identified by P20, P22, and P29 in TS•01 are not related to any one of P1 to P7 that have been registered in the table 201.

Therefore, the detector section 202 generates detection information Unneces for the unnecessary-packet areas TS00 identified by P20, P22, and P29, and outputs the unnecessary-packet information Unneces to the packet-overwriting section 205.

(STEP 26)

The overwriting section 205 receives the input of TS•01 from the first demodulator section 102(1), and the input of the unnecessary-packet detection information Unneces from the detector section 202. In addition, the packet-overwriting section 205 receives inputs of necessary packets NecesP in the state after the identifier conversion performed in the converting section 304, and the input of the necessary packet NecesP for which the identifier conversion has not been effected.

Then, the overwriting section 205 buffers these inputs. Subsequently, the overwriting section 205 overwrites the necessary packets NecesP extracted from TS•02 to the unnecessary-packet areas TS00 of the first TS 01 specified in the unnecessary-packet information Unneces, and buffers a new TS generated through the overwriting.

FIG. 15 shows a state where the packet P32 of the PAT, which is the necessary packet NecesP extracted from TS•02, is overwritten to the unnecessary-packet area TS00 of P20 in TS•01; the packet P10 of the PMT is overwritten to the unnecessary-packet area TS00 of P22 in TS•01; and in addition, the packet P37 of the EIT is overwritten to the unnecessary-packet area TS00 of P29 in TS•01.

The overwriting is carried so as not to change the order of P32 (=P2), P10, and P37 (=P7).

(STEP 27)

The new single CTS is thus generated by the overwriting method and buffered in the packet-overwriting section 205; and such CTSs successively generated and buffered in that manner are serially output to the TS-separating section 104.

(STEP 28)

PIDs of an ECM, an image signal stream, and an audio signal stream for the image-recording-desired broadcast program are acquired from the PMT in TS•02 including the image-recording-desired broadcast program currently being received. The acquisition is carried out in the TS-separating section 104.

(STEP 29)

The PIDs of the ECM, the image signal stream, and the audio signal stream are registered in the table 204(2). In an example state in FIG. 16, the PID of the ECM is shown as P11; the PID of the image signal stream is shown as P12; and the PID of the audio signal stream is shown as P13.

Therefore, in the example state, the respective PIDs P2, P7, P10, P11, P12, and P13 of the PAT, the EIT, the PMT, the ECM, the image signal stream, and the audio signal stream for the image-recording-desired broadcast program are registered in the table 204(2).

Ordinarily, for a viewing-desired broadcast program and an image-recording-desired broadcast program, PIDs of ECMs in P4 and P11 are different from each other, PIDs of image signal streams in P5 and P12 are different from each other, and PIDs of audio signal streams in P6 and P13 are different from each other. However, they can be identical to each other.

(STEP 30)

The extracting section 203(2), which receives the input of TS•02, extracts packets having PIDs of the PAT, the EIT, the PMT, the ECM, the image signal stream, and the audio signal (which have been registered in the table 204(2)) from TS•02.

Then, it outputs the PIDs as necessary packets NecesP to the determining section 303 and the converting section 304.

Figure 16:
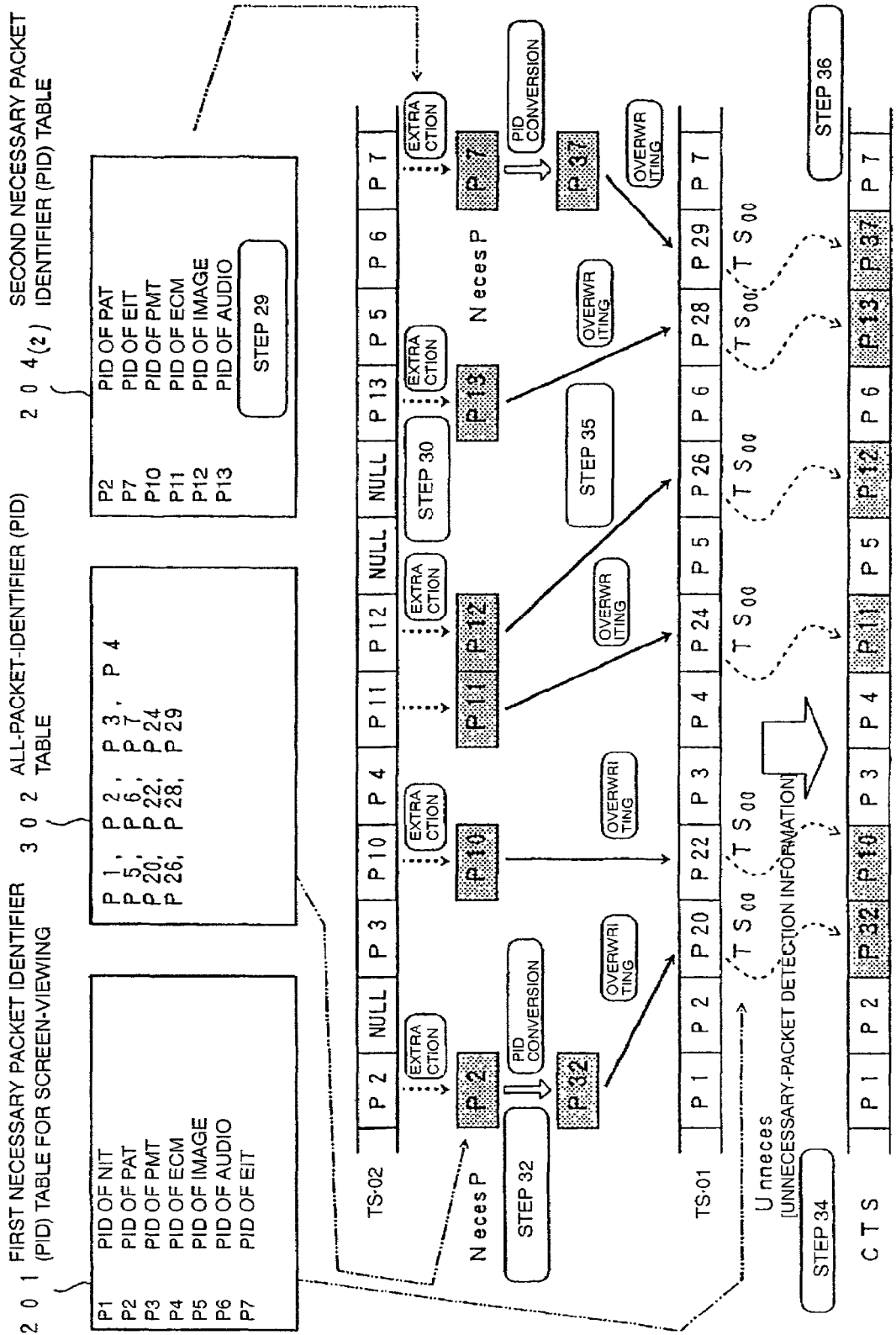
FIG. 16 is a view (continued from FIG. 15) for explaining the operation of the digital broadcast receiving apparatus according to the second preferred embodiment.

FIG. 16 shows a state where the packets identified with P2, P10, P11, P12, P13, and P7 are extracted.

(STEP 31)

The determining section 303 determines whether the PIDs P2, P10, P11, P12, P13, and P7 of the necessary packets NecesP, which have been input from the extracting section 203(2), identical to PIDs registered in the table 302.

If the PIDs are determined identical, processing proceeds to step 32; whereas if the PIDs are determined not identical, processing proceeds to step 33. Processing proceeds to step 23 for P2 and P7; whereas processing skips to step 24 for P10 to P13.

(STEP 32)

When the PIDs are duplicated, the converting section 304 performs processing similar to step 15 or 23. It converts P2 to P32, and converts P7 to P37. At this time, if P10 is identical to P3, the converting section 304 performs identifier conversion also for P10. This also applies to P11, P12, and P13.

(STEP 33)

Step 33 is performed to transmit the necessary packets NecesP of the PAT and the EIT having the post-identifier-conversion PIDs P32 and P37, and the necessary packets NecesP of the PMT, the ECM, the image signal stream, and the audio signal stream for which identifier conversion has not been performed are transmitted to the overwriting section 205.

(STEP 34)

The detector section 202 compares the input TS 01 with the first unnecessary-PID table 201; detects a packet having a PID not written from TS•01 into the table 201 for registration; and feeds unnecessary-packet information Unneces, which is a result of the detection, to the packet-overwriting section 205.

In FIG. 15, the unnecessary-packet areas TS00 identified by P20, P22, P24, P26, P28, and P29 in TS•01 are not related to any one of P1 to P7 that have been registered in the table 201.

Therefore, the detector section 202 generates detection information Unneces for the unnecessary-packet areas TSOO identified by P20, P22, P24, P26, P28, and P29, and outputs the unnecessary-packet information Unneces to the packet-overwriting section 205.

(STEP 35)

The overwriting section 205 receives the input of TS•01 from the first demodulator section 102(1), and the input of the unnecessary-packet detection information Unneces from the detector section 202.

In addition, the packet-overwriting section 205 receives inputs of necessary packets NecesP in the state after the identifier conversion performed in the converting section 304, and inputs of the necessary packets NecesP for which the identifier conversion has not been effected.

Then, the overwriting section 205 buffers these inputs. Subsequently, the overwriting section 205 overwrites the necessary packets NecesP extracted from TS•02 to the unnecessary-packet areas TS00 of the first TS 01 specified in the unnecessary-packet information Unneces, and buffers a new TS generated through the overwriting.

FIG. 16 shows a state where the packet P32 of the PAT, which is the necessary packet NecesP extracted from TS•02, is overwritten to the unnecessary-packet area TS00 of P20 in TS•01; the packet P10 of the PMT is overwritten to the unnecessary-packet area TS00 of P22 in TS•01; the packet P11 of the ECM is overwritten to the unnecessary-packet area TS00 of for P24 in TS•01; the packet P12 of the image signal stream is overwritten to the unnecessary-packet area TS00 of P26 in TS•01; the packet P13 of the audio signal stream is overwritten to the unnecessary-packet area TS00 of P28 in TS•01; and in addition, the packet P37 of the EIT is overwritten to the unnecessary-packet area TS00 of P29 in TS•01. The overwriting is carried so as not to change the order of P32 (=P2), P10, P11, P12, P13, and P37 (=P7).

(STEP 36)

The new single CTS is thus generated by the overwriting method and buffered in the packet-overwriting section 205; and such CTSs successively generated and buffered in that manner are serially output to the TS-separating section 104.

According to the operation of the sequence described above, the CTS includes not only the image signal stream, the audio signal stream, and the data signal stream for composing the specified viewing-desired broadcast program, but also the image signal stream, the audio signal stream, and the data signal stream streams for forming the specified image-recording-desired broadcast program.

The TS-separating section 104 transmits transport information regarding the image-recording-desired broadcast program to the digital recording device 803 via the digital interface 108. That is, while viewing the viewing-desired broadcast program, the image-recording-desired broadcast program can also be recorded simultaneously.

Third Preferred Embodiment

A third preferred embodiment is configured such that when arbitrary broadcast programs in plural TSs are multiplexed by overwriting; NULL packets among unnecessary packets on overwritten-side TSs are given priority, and overwriting is performed on the NULL packets. Hereinbelow, example operations of the second preferred embodiment will be described with reference to a combination of a viewing-desired broadcast program and download data.

Figure 17:
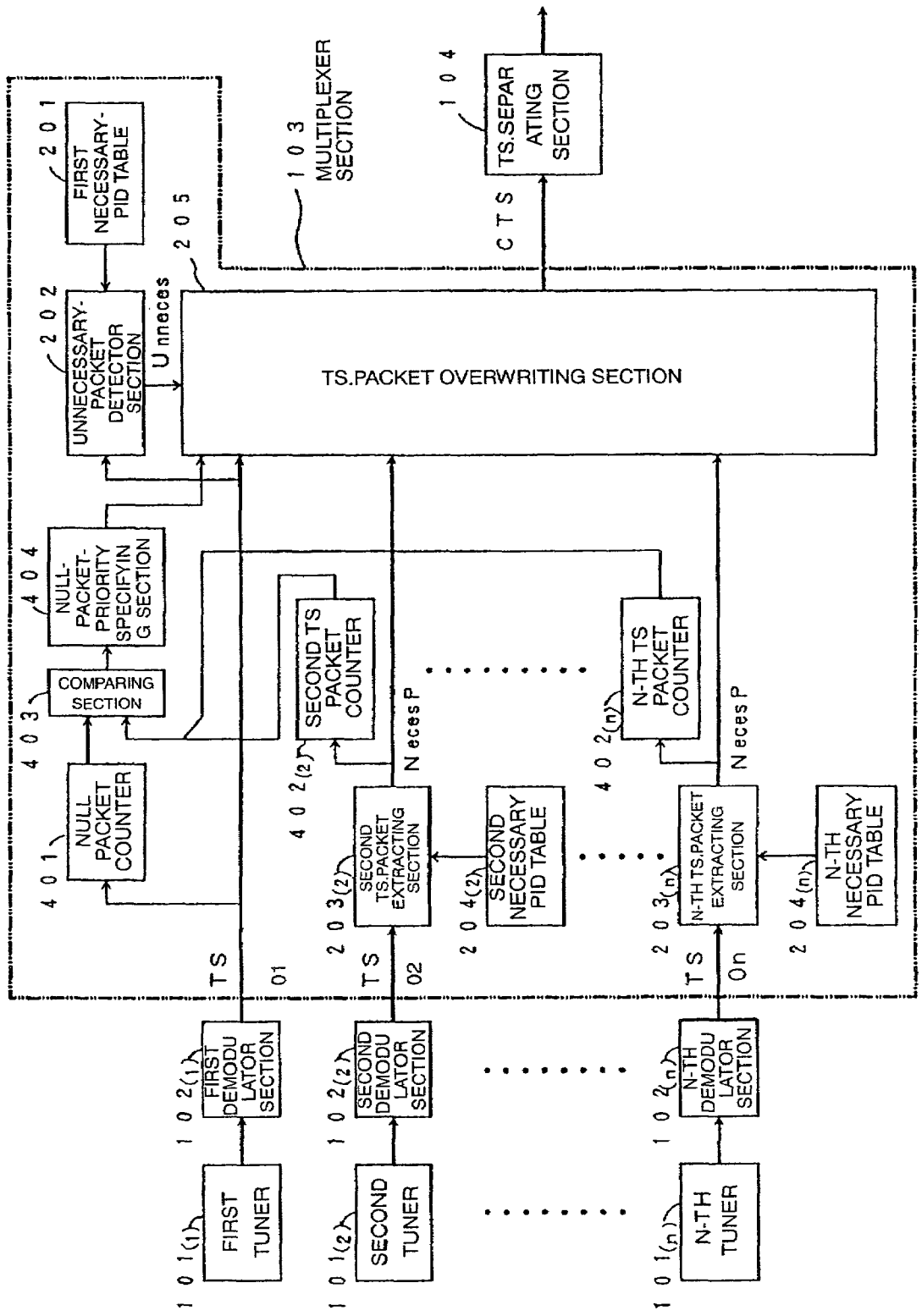
FIG. 17 is a block diagram showing a practical configuration of a multiplexer section of the digital broadcast receiving apparatus according to the third preferred embodiment.

FIG. 17 is a block diagram showing a practical configuration of a multiplexer section of a digital broadcast receiving apparatus according to the third preferred embodiment. The basic configuration thereof is shown in FIG. 1.

In FIG. 17, reference numeral 401 denotes a NULL packet counter for counting NULL packets included in TS•01; and it corresponds to a NULL-packet counting means. Reference numerals 402(n) to 402(n) respectively denote second to n-th packet counters for counting necessary packets NecesP extracted by the corresponding second to nth packet extracting sections disposed at the previous stages.

Reference numeral 403 denotes a comparing section for comparing a count value CNULL in a packet counter 401 with a count value CNP in one of packet counters 402(2) to 402(n). As a result, the packet counter 401 transmits comparison-result signals corresponding to the comparison results of CNULL$\geq$CNP and CNULL<CNP.

A reference numeral 404 denotes a NULL-packet-priority specifying section corresponding to a NULL-packet-priority specifying means in the appended claims. When the comparison-result signal received from the comparing section 403 represents CNULL≧CNP, the NULL-packet-priority specifying section 404 specifies NULL-packet areas for the packet-overwriting section 205 by giving priority as unnecessary-packet areas TS00 that will be overwritten.

Other potions in the configuration are the same as those in the first preferred embodiment (shown in FIG. 1). Therefore, using the same reference numerals and symbols as those in the first preferred embodiment, repetitious description thereof is omitted.

Hereinbelow, operation of the digital broadcast receiving apparatus according to the third preferred embodiment will be described referring to an operation-explanatory view in FIG. 18. The description will be made with reference to an example case where two TSs, one TS including a viewing-desired broadcast program and the other TS including download data, are input for processing.

(STEP 1)
Step 1 is similar to the case in the first preferred embodiment. That is, as shown in FIG. 18, a table 201 is used to register respective PIDs P1 to P7 of a NIT, a PAT, a PMT, an ECM, an image signal stream, an audio signal stream, and an EIT.

(STEP 2)
A user operates the input section 112 and thereby specifies downloading.

(STEP 3)
The CPU 109 switches to a transponder through which the desired download data is transmitted. Specifically, through analysis of a NIT acquired from TS 01 for the viewing-desired broadcast program, the CPU 109 detects a download control table (DCT) described in download control information.

It then detects an identifier of a TS (TS identifier) including the download data, acquires transmission-line information corresponding to the TS identifier, sets it to the tuner 101(2), and controls the demodulator section 102(2) to be active.

As a result, an input modulated wave is demodulated into a TS conforming to MPEG-2, and the TS is output to the extracting section 203(2). The TS thereby modulated is referred to as TS•02 and includes the download data. In the above, the TS including the download data may be received by a different tuner.

(STEP 4)
The CPU 109 registers a PID, i.e., P40, of a DCT (having a PID represented by "0x0017"), on which a downloading target type and the like are described, in the table 204(2) associated with the tuner 101(2).

(STEP 5)
The extracting section 203(2) extracts a packet having the PID P40 of the DCT registered in the table 204(2) from TS•02, and outputs the packet as a necessary packet NecesP to the packet-overwriting section 205.

(STEP 6)
Step 6 is performed to acquire PID of a download table (DLT; a PID of the DLT is described in the DCT) on which a downloadable broadcast program is written from the DCT in TS•02 that includes downloadable data currently being received.

Concurrently, the step is performed to acquire a PID of an ECM (of which a PID is described in the DCT) that is required to descramble the DLT. The PIDs corresponds to P41 and P42 shown as examples in the figure.

(STEP 7)
The respective PIDs P41 and P42 of the DLT and the ECM, which have been acquired in step 6, are registered in the table 204(2). Thus, the respective PIDs P40, P41, and P42 of the DCT, the DLT, the ECM for the downloadable data are registered in the table 204(2).

(STEP 8)
The extracting section 203(2) receives TS•02 and extracts packets having the PIDs of the DCT, the DLT, and the ECM, which have been registered in the table 204(2), from TS•02. Then, the extracting section 203(2) outputs the packets as necessary packets NecesP to a counter 402(2) and the packet-overwriting section 205.

FIG. 18 shows the case of extracting only the necessary packets individually identified by P40, P41, and P42; that is, only the individual packets of the DCT, the DLT, and the ECM.

(STEP 9)
The NULL-packet counter 401 counts NULL packets included in TS•01 at a periodical interval T0. It then outputs a resultant count value CNULL to the comparing section 403.

(STEP 10)
The counter 402(2) counts the necessary packets NecesP extracted in step 8 at the aforementioned periodical interval T0. It then outputs a resultant count value CNP to the comparing section 403.

(STEP 11)
The comparing section 403 compares the count value CNULL in the NULL-packet counter 401 with the count value CNP in the counter 402(2). If the result is CNULL≧CNP, processing proceeds to step 12. If CNULL<CNP, processing proceeds to step 13.

(STEP 12)
When CNULL≧CNP, the packet-overwriting section 205 serially overwrites the necessary packets NecesP, which have been received from the extracting section 203(2), to the NULL packets in TS•01 in the order of detection. In this case, as accurately as possible, the overwriting is performed so that the number of the necessary packets NecesP becomes substantially equal in the first half and second half of the aforementioned periodical interval T0. This applies to the case of FIG. 18A.

(STEP 13)
When CNULL<CNP, the packet-overwriting section 205 overwrites the necessary packets NecesP, that is, when the number of NULL packets is short, the necessary packets NecesP are overwritten to the unnecessary packets in TS•01 based on detection information Unneces received from the unnecessary-packet detector section 202.

The overwriting is performed so that the NULL packets are given priority, and the number of the necessary packets NecesP becomes substantially equal in the first half and second half of the aforementioned periodical interval T0. This applies to the case of FIG. 18B.

(STEP 14)
The new single CTS is thus generated by the overwriting method and buffered in the packet-overwriting section 205; and such CTSs successively generated and buffered in that manner are serially output to the TS-separating section 104.

According to the operation of the sequence described above, the CTS includes not only the image signal stream, the audio signal stream, and the data signal stream for composing the specified viewing-desired broadcast program, but also the downloadable data.

The downloadable data is transferred from the TS-separating section 104 to the digital recording device 803 made of, for example, a nonvolatile memory or a hard disk, via the digital interface 108.

According to the above operation, while displaying a viewing-desired broadcast program, data such as a new program, can be downloaded simultaneously.

Fourth Preferred Embodiment

The following configuration is conceivable as a modified configuration of the third preferred embodiment. It is equivalent to the configuration shown FIG. 17, in which the NULL-packet counter 401 is omitted.

Without the NULL-packet counter 401, there is no way to know whether the number of NULL packets is smaller than the number of post-extraction necessary packets NecesP.

To overcome the above problem, the configuration is built as follows. It is assumed that in packet areas onto which necessary packets NecesP are overwritten, NULL packets in TS•01 are assumed to be given priority for overwriting.

When at least one of the necessary packets NecesP is input, overwriting is immediately executed upon receipt of an input NULL packet. However, when no NULL packet is input, the received necessary packet NecesP is held pending until receipt of an input NULL packet.

Upon receipt of an input NULL packet, the necessary packet NecesP held pending is immediately overwritten to the received NULL packet.

In the above configuration, however, delay in input of the NULL packet causes increase in the number of necessary packets NecesP to be held pending. To prevent this, the configuration is provided with additional functions such that when the number of pending necessary packets NecesP reaches a predetermined value, the packet-overwriting section 205 stops awaiting the input of a NULL packet, but executes overwriting to an unnecessary-packet areas TS00 in place of the NULL packet in TS•01. The fourth preferred embodiment is configured as described above.

Operation status of the fourth preferred embodiment is shown in FIGS. 19A and 19B. The configuration of a digital broadcast receiving apparatus according to the fourth preferred embodiment is the same as that shown in FIG. 17.

FIG. 19A shows a status where the number of NULL packets is relatively large, and all of extracted necessary packets NecesP are overwritten to the NULL packets. FIG. 19B shows a status where the number of NULL packets is relatively small, and overwriting is executed in the second half of the periodical interval T0 to unnecessary-packet areas TS00 in place of NULL packets.

Fifth Preferred Embodiment

A fifth preferred embodiment is configured such that multiplexing of arbitrary broadcast programs in plural TSs is executed by "insertion" instead of the "overwriting".

Hereinbelow, operation of the digital broadcast receiving apparatus according to the fifth preferred embodiment will be described with reference to an example case where a viewing-desired broadcast program and a data broadcast program such as an electronic music delivery (EMD).

FIG. 20 is a block diagram showing a practical configuration of a multiplexer section according to the fifth preferred embodiment. The basic configuration thereof is shown in FIG. 1.

In FIG. 20, reference numeral 203(1) denotes a first packet extracting section for extracting necessary packets from TS•01. Reference numeral 204(1) is a table used for registering PIDs required for the packet extraction in the extracting section 203(1).

The table 204(1) is equivalent to the table 201 in the above-described preferred embodiments. The extracting section 203(1) is similar to each of other extracting sections 203(2) to 203(n); and also, the table 204(1) is similar to each of other tables 204(2) to 204(n).

Reference numeral 501 denotes a packet-inserting section 501. Other potions in the configuration are the same as those in the first preferred embodiment (shown in FIG. 1). Therefore, using the same reference numerals and symbols as those in the first preferred embodiment, repetitious description thereof is omitted.

Hereinbelow, operation of the digital broadcast receiving apparatus according to the third preferred embodiment will be described referring to an operation-explanatory views in FIGS. 21 to 22.

The description will be made with reference to an example case where two TSs, one TS including a viewing-desired broadcast program and the other TS including download data, are input for processing.

(STEP 1)
Step 1 is similar to the case in the first preferred embodiment. That is, as shown in FIG. 18, a table 204(1) is used to register respective PIDs P1 to P7 of a NIT, a PAT, a PMT, an ECM, an image signal stream, an audio signal stream, and an EIT.

(STEP 2)
A user operates the input section 112 and thereby specifies a data broadcast program.

(STEP 3)
As described in the previous case, the tuner 101(2) is set to select a transponder so as to acquire TS•02 including the data broadcast program.

Figure 21:
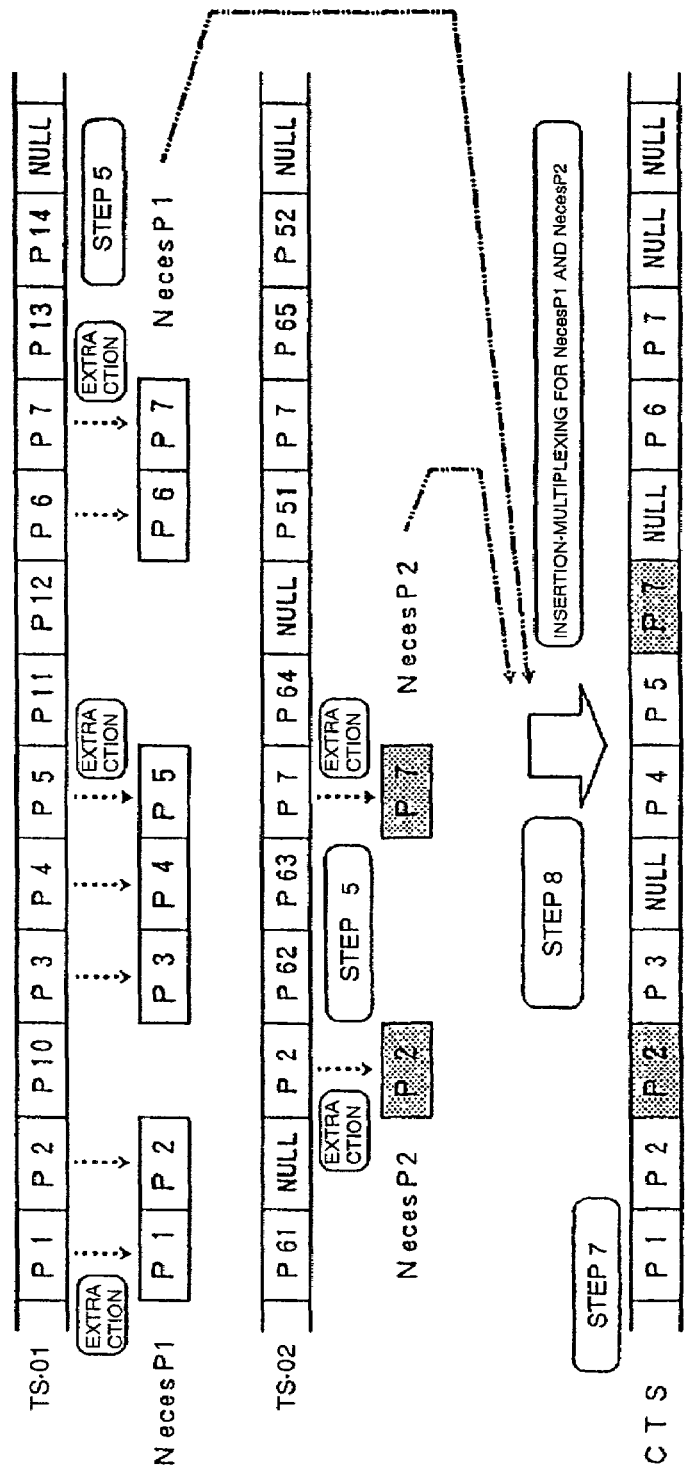
FIG. 21 is a view for explaining operation of the digital broadcast receiving apparatus according to the fifth preferred embodiment.

(STEP 4)
As shown in FIG. 21, the CPU 109 selectively registers a PID of the upper-ranked PAT, that is, P2, in PSI for the data broadcast program, and a PID of the EIT (SI), that is, P7.

(STEP 5)
From TS•01, the extracting section 203(1) extracts packets having the PIDs registered in the table 204(1). It then outputs the extracted packets as necessary packets NecesP1 to the packet-inserting section 501.

FIG. 21 shows a state where only necessary packets NecesP1 corresponding to P1 to P7, that is, packets of a NIT, PAT, PMT, ECM, image signal stream, and EIT are extracted.

From TS•02, the extracting section 203(2) extracts packets having PIDs of the PAT and EIT, which have been registered in the table 204(2), and then outputs the extracted packets as necessary packets NecesP2 to the packet-inserting section 501.

FIG. 21 shows a state where only packets of the PAT and EIT, which are individually identified by P2 and P7, are extracted.

(STEP 6)
The packet-inserting section 501 individually receives inputs of the necessary packets NecesP1, which have been extracted in the extracting section 203(1), and inputs of the necessary packets NecesP2, which have been extracted in the extracting section 203(2); and buffers the packets.

Subsequently, the packet-inserting section 501 performs insertion of the necessary packets NecesP1 and NecesP2 to mutually be inserted, and multiplexes them in an appropriate order. It then buffers a single new TS (CTS) generated by the insertion-multiplexing.

In the above processing, the original order of the necessary packets NecesP1 in TS•01 is maintained to be the same; that is, the order is maintained unchanged. This is also applied to the order of the necessary packets NecesP2. When no necessary packets NecesP1 and NecesP2 exist, NULL packets are instead inserted.

(STEP 7)

The new single CTS is thus generated by the insertion method and buffered in the packet-inserting section 501; and such CTSs successively generated and buffered in that manner are serially output to the TS-separating section 104.

(STEP 8)

A PID of a PMT for the data broadcast program is acquired from the PAT in TS•02 including the data broadcast program currently being received. The acquisition is carried out in the TS-separating section 104.

(STEP 9)

The PMT PID acquired in step 8 is registered in the table 204(2). As in an example state shown in the figure, the PMT PID is assumed to be P10. Therefore, the respective PIDs P2, P7, and P51 of the PAT, the EIT, and the PMT for the data broadcast program are registered in the table 204(2).

(STEP 10)

Similarly to step 5, from TS•01, the extracting section 203(1) extracts packets having the respective PIDs P1 to P7 of the NIT, PAT, PMT, ECM, image signal stream, audio signal stream, and EIT, the PIDs having been registered in the table 204(1).

It then outputs the extracted packets as necessary packets NecesP1 to the packet-inserting section 501.

From TS•02, the extracting section 203(2) extracts packets having the respective PIDs P2, P7, and P51 of the PAT, EIT, and PMT, the PIDs having been registered in the table 204(2); and it then outputs the extracted packets as necessary packets NecesP2 to the packet-inserting section 501.

(STEP 11)

Similarly to step 6, the packet-inserting section 501 individually receives inputs of the necessary packets NecesP1, which have been extracted in the extracting section 203(1), and inputs of the necessary packets NecesP2, which have been extracted in the extracting section 203(2); and buffers the packets.

Subsequently, the packet-inserting section 501 performs insertion of the necessary packets NecesP1 and NecesP2 to mutually be inserted, and multiplexes them in an appropriate order. It then buffers a single new TS (CTS) generated by the insertion-multiplexing. When no necessary packets NecesP1 and NecesP2 exist, NULL packets are instead inserted.

(STEP 12)

The new single CTS is thus generated by the insertion method and buffered in the packet-inserting section 501; and such CTSs successively generated and buffered in that manner are serially output to the TS-separating section 104.

(STEP 13)

A PID of a data signal stream for the data broadcast program is acquired from the PMT in TS•02 including the data broadcast program currently being received. The acquisition is carried out in the TS-separating section 104.

(STEP 14)

The PID acquired in step 13 is registered in the table 204(2). As shown in the figure, the PID of the data signal stream of the data broadcast program is assumed to be P52.

Therefore, the respective PIDs P2, P7, and P51 of the PAT, the EIT, and the PMT for the data broadcast program are registered in the table 204(2).

The data broadcast program in the present preferred embodiment is assumed to be of a nonscramble type, and multiplexing for the ECMs is not therefore performed.

However, depending on the case, the multiplexing of ECMs may perhaps be performed.

(STEP 15)

Similarly to step 5, from TS•01, the extracting section 203(1) extracts packets having the respective PIDs P1 to P7 of the NIT, PAT, PMT, ECM, image signal stream, audio signal stream, and EIT, the PIDs having been registered in the table 204(1).

It then outputs the extracted packets as necessary packets NecesP1 to the packet-inserting section 501.

From TS•02, the extracting section 203(2) extracts packets having the respective PIDs P2, P7, P51, and P52 of the PAT, EIT, PMT, and the data signal stream, the PIDs having been registered in the table 204(2); and it then outputs the extracted packets as necessary packets NecesP2 to the packet-inserting section 501.

(STEP 16)

Similarly to step 6, the packet-inserting section 501 individually receives inputs of the necessary packets NecesP1, which have been extracted in the extracting section 203(1), and inputs of the necessary packets NecesP2, which have been extracted in the extracting section 203(2); and buffers the packets.

Subsequently, the packet-inserting section 501 performs insertion of the necessary packets NecesP1 and NecesP2 to mutually be inserted, and multiplexes them in an appropriate order. It then buffers a single new TS (CTS) generated by the insertion-multiplexing.

(STEP 17)

The new single CTS is thus generated by the insertion overwriting method and buffered in the packet-inserting section 501; and such CTSs successively generated and buffered in that manner are serially output to the TS-separating section 104.

According to the operation of the sequence described above, the CTS includes not only the image signal stream, the audio signal stream, and the data signal stream for composing the specified viewing-desired broadcast program, but also the data signal stream for composing the specified data broadcast program.

The data signal stream for the data broadcast program is transmitted from the TS-separating section 104 to, for example, an MD deck, used for the digital recording device 803, via the digital interface 108. Thereby, music can be recorded, or can be enjoyed and recorded at the same time.

Specifically, while the display of a viewing-desired broadcast program is continued, a data broadcast program such as an EMD can be received or recorded.

Sixth Preferred Embodiment

According to the fifth preferred embodiment described above, the PIDs P2 of the PATs in TS•01 and TS•02 are identical to each other; and also, the PIDs P7 of the EITs in TS•01 and TS•02 are identical to each other.

They are not distinguished from each other and are multiplexed into the CTS. To distinguish them for the multiplexing, the fifth preferred embodiment is configured such that identifier conversion similar to that in the second preferred embodiment is performed.

Figure 24:
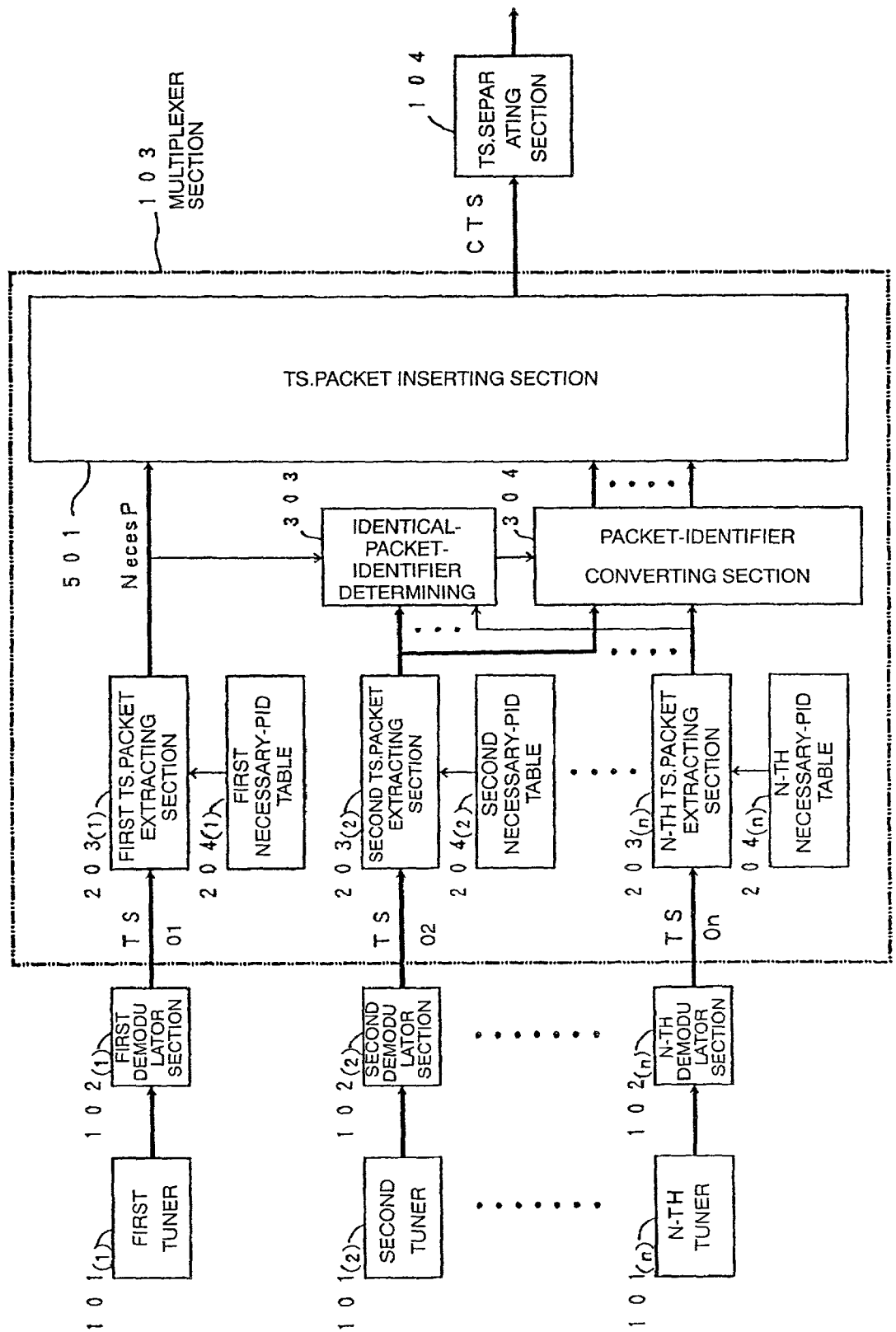
FIG. 24 is a block diagram showing a practical configuration of a multiplexer section of the digital broadcast receiving apparatus according to the sixth preferred embodiment.

A sixth preferred embodiment is configured as described above. FIG. 24 shows a practical configuration of a digital broadcast receiving apparatus according to the sixth preferred embodiment. Operation thereof is substantially the same as that of the individual preferred embodiments described above; therefore, description thereof is omitted.

Seventh Preferred Embodiment

In the above, the PID conversion when PIDs on the two TSs are duplicated is described that duplicate PIDs in one of the TSs are converted. However, a configuration can be built such that PID conversion is executed for all necessary packets extracted from plural TSs, which are inputs for multiplexing processing.

Figure 25:
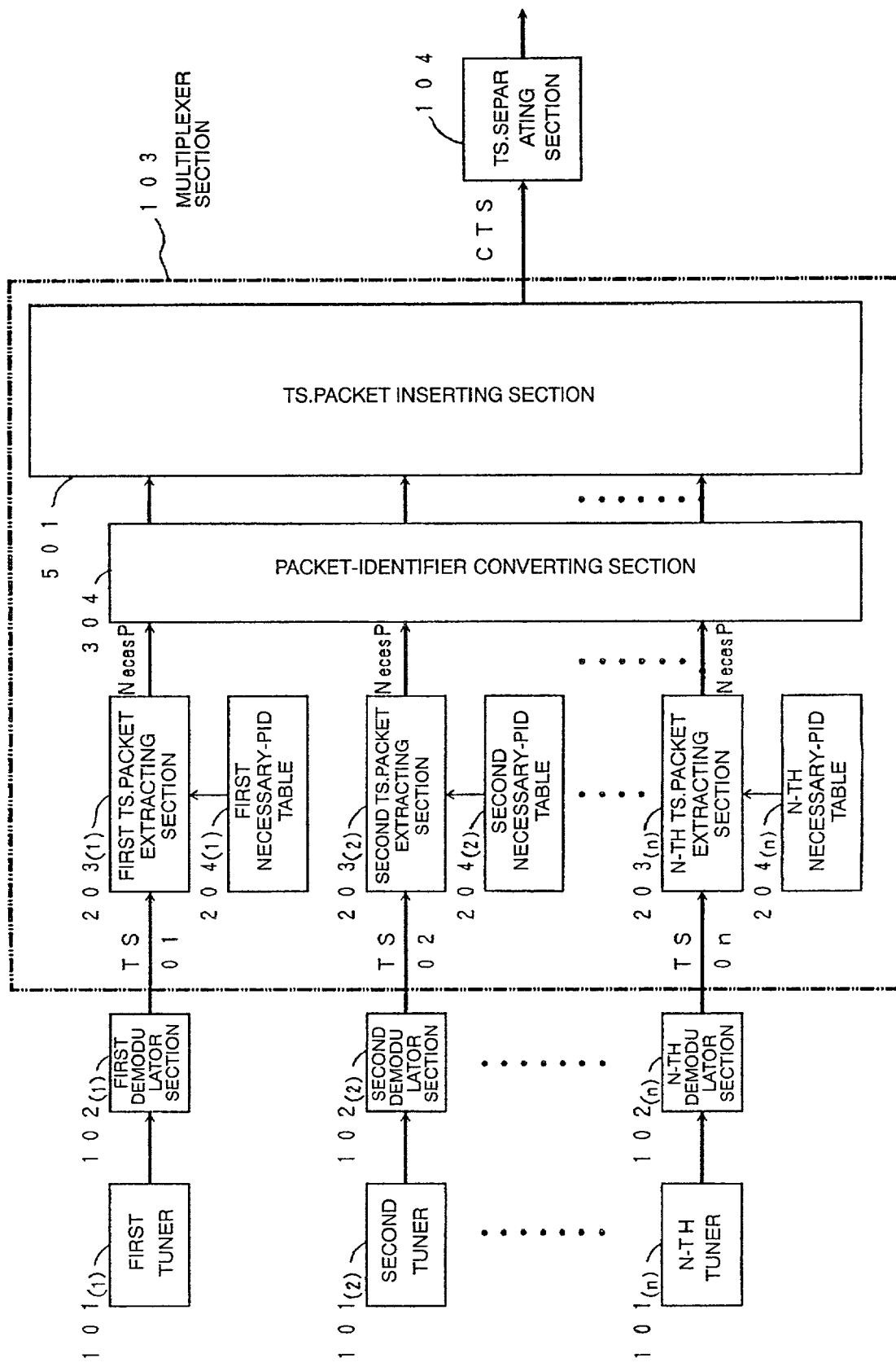
FIG. 25 is a block diagram showing a practical configuration of a multiplexer section of the digital broadcast receiving apparatus according to the seventh preferred embodiment.

FIG. 25 is a block diagram showing a practical configuration of a multiplexer section of the digital broadcast receiving apparatus according to the seventh specific example.

Reference numeral 304 denotes a PID-converting section 304 for receiving necessary packets NecesP individually input from the first to n-th extracting sections 203(1) to 203(n), and rewrites PIDs of all the input necessary packets NecesP.

Figure 26:
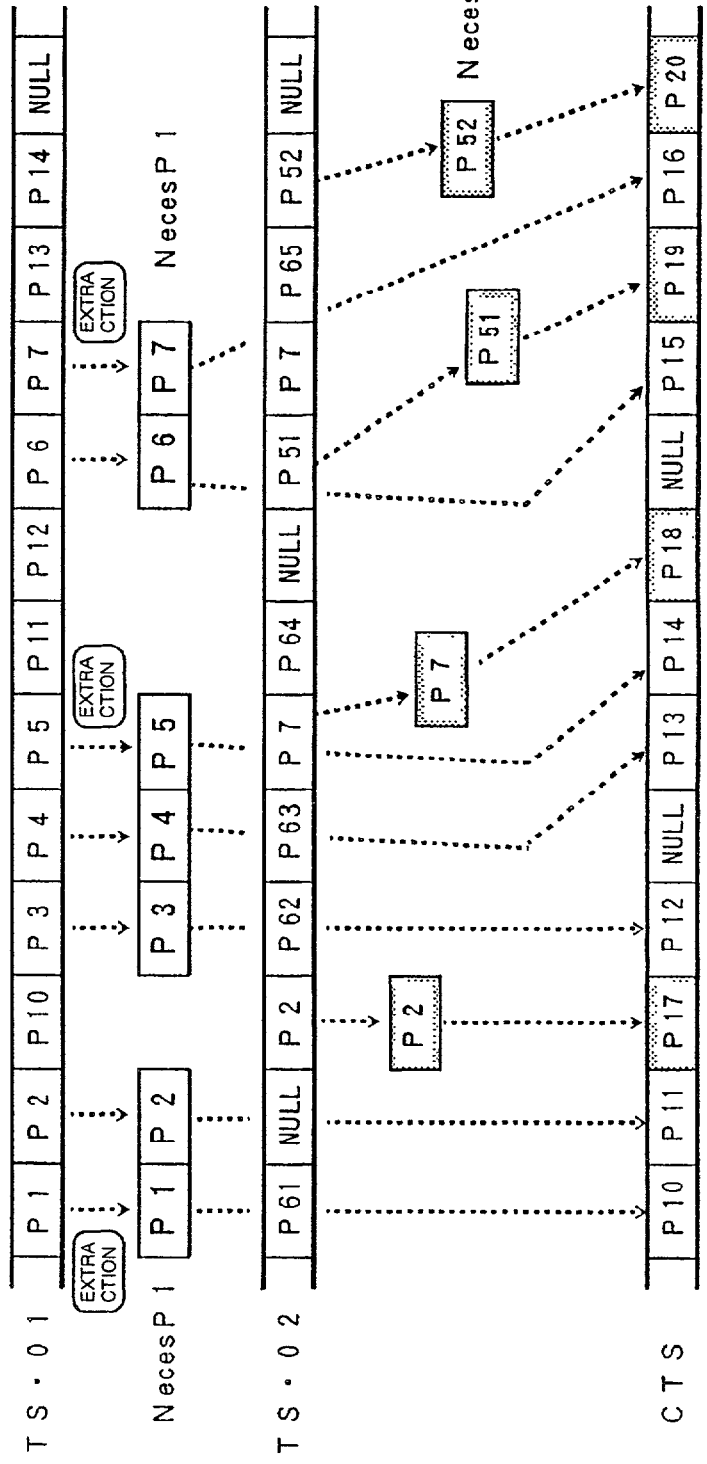
FIG. 26 is a view for explaining operation of the digital broadcast receiving apparatus according to the seventh preferred embodiment.

As shown in FIG. 26, for respective necessary packets NecesP originally belonging to TS•01 with PIDs P1, P2, P3, P4, P5, P6, and P7 and, the PID-converting section 304 allocates new serial numbers P10, P11, P12, P13, P14, P15, and P16 as their PIDs.

Also, for respective necessary packets NecesP originally belonging to TS•02 with PIDs P2, P7, and P51, and P52, the PID-converting section 304 allocates further continuing new serial numbers P17, P18, P19, and P20 as their PIDs. As a result, PIDs of packets composing CTSs multiplexed and thereby generated are therefore formed of serial numbers P10 to P20, which are different from one another.

A preferable PID-converting section 304 comprises a function for memorizing a PID that is to be allocated subsequent to allocation of a PID to to necessary packets NecesP. This function enables automatic allocation of serial PID numbers that are different every time multiplexing is executed.

In the above-described example, when PIDs are sequentially incremented from P10 to P20 and are thereby used, the subsequent start PID number is "21". Therefore, with the above-described preferable function, when the subsequent multiplexing processing is executed for the CTS, a PID P21 is allocated to a necessary packet NecesP thereof.

Figure 27:
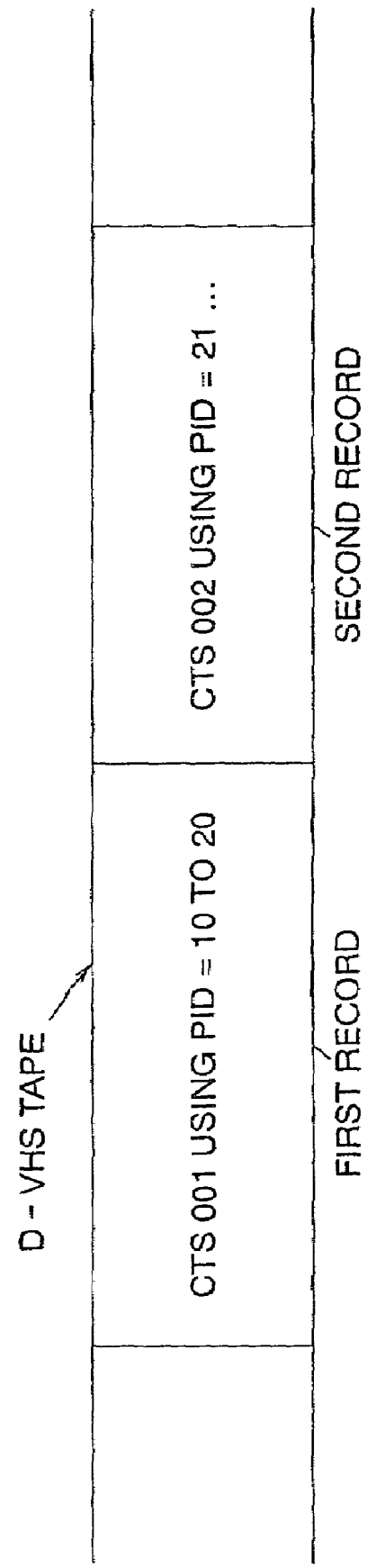
FIG. 27 is a view for explaining operation when a CTS generated by the digital broadcast receiving apparatus of the seventh preferred embodiment is recorded in a digital recording device.
Figure 28:
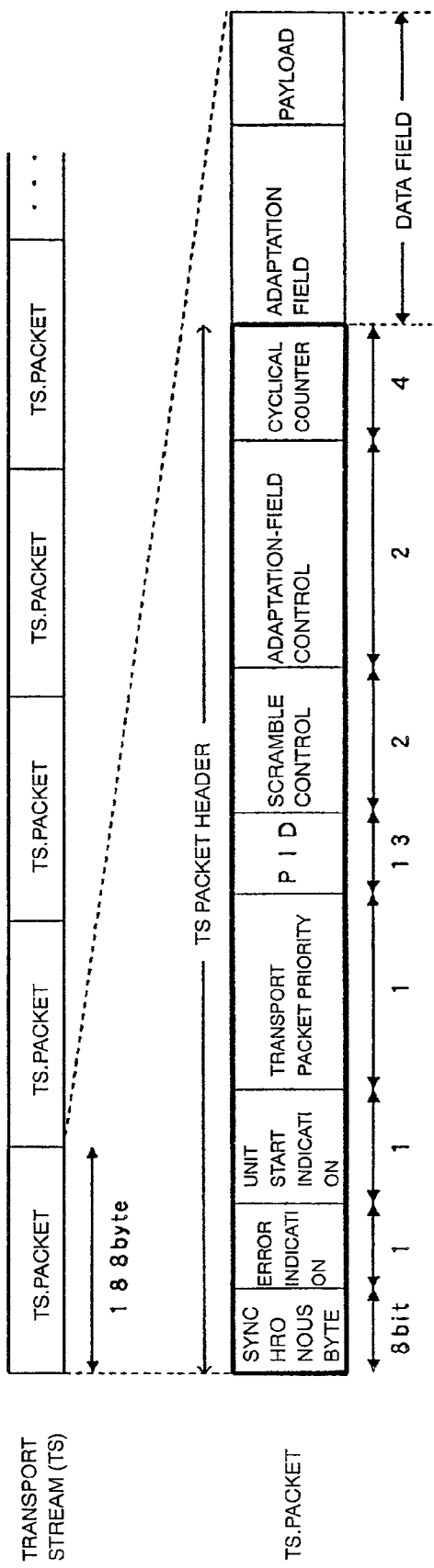
FIG. 28 is a view showing a configuration of MPEG-2 TS packet.

The function of the PID-converting section 304 is effective in recording CTSs by using the digital recording device 803 shown in FIG. 1, particularly, a device that sequentially accesses them by suing a tape such as a VHS tape. FIG. 27 shows a state where a first CTS•001 is initially recorded; and, as described above, PIDs P21 and larger are used to subsequently record a second CTS•002.

If PIDs of an image, audio, and the like for the first CTS•001 are identical to PIDs of an image, audio, and the like for the second CTS•002, even to replay one of CTS•001 and CTS•002, normal display is impossible.

Practically, block noise is generated in an image, and abnormal sounds are generated in audio. However, as in the seventh preferred embodiment, by changing PIDs every time a CTS is created so that the PIDs are different form one another, the problems as described above can be prevented.

As a matter common to all the preferred embodiments wherein PIDs are rewritten, user-data-using numbers defined by the MPEG-2 standards are preferably used for the PIDs that are to be rewritten. The numbers are not used by the system, but are opened to users.

Specifically, for the PIDs, although values from 1FFFF (hexadecimal digits) are usable, user-data-using numbers from 10 (hexadecimal digits) to 1FFFE (hexadecimal digits) can be allocated. Thereby, problems that can occur in compatibility can be prevented.

While the individual preferred embodiments have been described with reference to the cases where all the plural TSs to be combined belong to the CS broadcast, the invention is not confined to such cases. The types of broadcasts to be handled by the invention include not only the CS broadcast, but also other broadcasts such as a BS digital broadcast and a ground-wave broadcast.

In addition, the invention may be applied to a case where arbitrary contents are combined using plural TSs in a state where the plural types of broadcasts are mixing.

Since the format of the individual TS output from the demodulator section conforms to the MPEG standards, which is common to the aforementioned plural types of broadcasts, no modification is required for the separating section. For MPEG, any one of phases 1, 2, 4, and 7 may be employed and JPEG may instead be employed.

Furthermore, the present invention has been described with reference to the most preferable preferred embodiments. However, the combination of the components and the arrangement thereof may be modified in various ways within the spirit and scope of the invention as claimed in the appended claims.

What is claimed is:

1. A digital broadcast receiving apparatus comprising a packet-overwriting device capable of overwriting unnecessary-packet areas corresponding to unnecessary packet identifiers (PIDs) in a first transport stream (TS) using packets corresponding to necessary PIDs in a second TS; and necessary-packet extracting means for extracting packets corresponding to necessary PIDs in a second TS input from a second one of said demodulator sections, where the first one of said demodulator sections is different from the second one of said demodulator sections; and packet-overwriting means for overwriting packets extracted by said necessary-packet extracting means to said unnecessary-packet areas detected by said unnecessary-packet detecting means, wherein a custom transfer stream output from said packet-overwriting means is output to at least one of said output destinations specified by said input section.

2. A digital broadcast receiving apparatus as defined in claim 1, wherein when packets to be multiplexed by the overwriting, the packets in at least one of the first and second TSs are rewritten to make the packets to be different from one another.

3. A digital broadcast receiving apparatus as defined in claim 2, wherein PIDs of packets in the first TS where packets are rewritten through the overwriting are rewritten.

4. A digital broadcast receiving apparatus as defined in claim 1, wherein NULL-packet areas are the unnecessary-packet areas corresponding to the unnecessary PIDs and are given priority.

5. A digital broadcast receiving apparatus as defined claim 1, wherein a plurality of TSs including packets to be multiplexed through the overwriting are input as objects, the plurality of TSs being selectable from (a) a TS including viewing-desired broadcast program data, (b) a TS including broadcast-program-table related data, (c) a TS including downloadable data, (d) a TS including image-recording-desired broadcast program data, and (e) TSs including other broadcast program data; and packets in the plurality of selected TSs are multiplexed.

6. A digital broadcast receiving apparatus according to claim 5, wherein the apparatus is one of (a) an image-playback apparatus, (b) an audio-recording apparatus, and (c) a digital-image recording apparatus.

7. A digital broadcast receiving apparatus comprising: unnecessary-packet detecting means for detecting unnecessary-packet areas corresponding to unnecessary packet identifiers (PIDs) in a first transport stream (TS) that is input; necessary-packet extracting means for extracting packets corresponding to necessary PIDs in a second TS input from a second one of said demodulator sections, where the first one of said demodulator sections is different from the second one of said demodulator sections; and packet-overwriting means for overwriting packets extracted by said necessary-packet extracting means to said unnecessary-packet areas detected by said unnecessary-packet detecting means in the first TS, wherein a custom transfer stream output from said packet-overwriting means is output to at least one of said output destinations specified by said input section.

8. A digital broadcast receiving apparatus as defined in claim 7, comprising: identical-PID determining means for determining whether identical PIDs exist in both the first and second TSs for the packets that are to be multiplexed with each other through said overwriting; and PID-converting means for performing rewriting of PIDs of packets in at least one of the first and second TSs so that the identical PIDs in the first and second TSs are differentiated for packets that are determined by said identical-PID determining means to have the identical PIDs.

9. A digital broadcast receiving apparatus as defined in claim 8, wherein the PID-converting means is configured to convert said PIDs so as to be opened to a user.

10. A digital broadcast receiving apparatus as defined in claim 7, comprising: NULL-packet counting means for counting NULL packets coming from said first TS; packet counting means for counting post-extraction NULL packets in the second TS comparing means for comparing a NULL-packet count value output by said NULL-packet counting means with a packet count value output by said packet counting means; and NULL-packet-priority specifying means for specifying NULL-packet areas with priority as unnecessary-packet areas corresponding to said unnecessary PIDs when said NULL packet count value is equal to or greater than the packet count value.

11. A digital broadcast receiving apparatus as defined in claim 7, wherein said packet-overwriting device is capable of giving NULL-packet areas priority as overwrite objects, when a detection frequency of NULL packets in the first TS is high and performing overwriting to other unnecessary-packet areas when overwriting of said extracted packets to NULL packets is suspended, and the number of packets held pending for the overwriting reaches a predetermined value.

12. A digital broadcast receiving apparatus comprising: tuners for receiving modulated waves of digital broadcast waves; a plurality of groups of demodulator sections for demodulating signals output from said tuners to thereby output transport streams (TSs); an input section for selecting a plurality of desired TSs and for specifying output destinations; unnecessary-packet detecting means for detecting unnecessary-packet areas corresponding to unnecessary packet identifiers (PIDs) in a first TS input from a first one of said demodulator sections; necessary-packet extracting means for extracting packets corresponding to necessary PIDs in a second TS input from a second one of said demodulator sections, where the first one of said demodulator sections is different from the second one of said demodulator sections; and packet-overwriting means for overwriting packets extracted by said necessary-packet extracting means to said unnecessary-packet areas detected by said unnecessary-packet detecting means, wherein a custom transfer stream output from said packet-overwriting means is output to at least one of said output destinations specified by said input section.

13. A digital-broadcast receiving method comprising the steps of:
registering necessary packet identifiers (PIDs) regarding a first transport stream (TS) that is input; registering necessary PIDs regarding a second TS that is input; detecting unnecessary PIDs in said first TS extracting packets corresponding to said registered necessary PIDs regarding the second TS from the second TS; overwriting packets extracted from said second TS to unnecessary-packet areas corresponding to said unnecessary PIDs in said first TS;
necessary-packet extracting means for extracting packets corresponding to necessary PIDs in a second TS input from a second one of said demodulator sections, where the first one of said demodulator sections is different from the second one of said demodulator sections: and packet-overwriting means for overwriting packets extracted by said necessary-packet extracting means to said unnecessary-packet areas detected by said unnecessary-packet detecting means, wherein a custom transfer stream output from said packet-overwriting means is output to at least one of said output destinations specified by said input section.

14. A computer-readable recording medium containing a digital-broadcast-receiving software program, which, when read by the computer, causes the computer to execute the steps of: registering necessary packet identifiers (PIDs) regarding a first transport stream (TS) that is input; registering necessary PIDs regarding a second TS that is input; detecting unnecessary PIDs in said first TS extracting packets corresponding to said registered necessary PIDs regarding the second TS from the input second TS; overwriting packets extracted from said second TS to the unnecessary-packet areas corresponding to the unnecessary PIDs detected in said first TS; necessary-packet extracting means for extracting packets corresponding to necessary PIDs in a second TS input from a second one of said demodulator sections, where the first one of said demodulator sections is different from the second one of said demodulator sections; and packet-overwriting means for overwriting packets extracted by said necessary-packet extracting means to said unnecessary-packet areas detected by said unnecessary-packet detecting means, wherein a custom transfer stream output from said packet-overwriting means is output to at least one of said output destinations specified by said input section.

* * * * *